(12) United States Patent
Marx et al.

(10) Patent No.: US 7,905,542 B2
(45) Date of Patent: Mar. 15, 2011

(54) MODULAR TILT SLIDE SUNROOF ASSEMBLY AND METHOD OF MANUFACTURE

(75) Inventors: Craig T Marx, Washington, MI (US); James D Sahlaney, Eastpointe, MI (US); Randall W Budnick, Shelby Township, MI (US); Lisa Marie Pomeroy, Macomb, MI (US); Steven H Klotz, Commerce Township, MI (US); Thomas Murray, Columbiaville, MI (US); Michael J McIsaac, Chesterfield Township, MI (US); Joachim Juergen Gernot Klesing, Rochester Hills, MI (US)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 12/489,742

(22) Filed: Jun. 23, 2009

(65) Prior Publication Data
US 2010/0320808 A1 Dec. 23, 2010

(51) Int. Cl.
*B60J 7/053* (2006.01)
*B60J 3/02* (2006.01)
(52) U.S. Cl. ............ 296/216.08; 296/213; 296/214
(58) Field of Classification Search ............ 296/213, 296/214, 216.06–216.08
See application file for complete search history.

(56) References Cited

U.S. PATENT DOCUMENTS

| | | | | |
|---|---|---|---|---|
| 3,558,183 A * | 1/1971 | Sigmund | | 16/93 R |
| 5,149,170 A * | 9/1992 | Matsubara et al. | | 296/213 |
| 5,332,282 A * | 7/1994 | Maeda et al. | | 296/213 |
| 6,129,413 A * | 10/2000 | Klein | | 296/220.01 |
| 6,942,284 B2 * | 9/2005 | Manders et al. | | 296/213 |
| 7,441,833 B1 | 10/2008 | Pomeroy | | |
| 2004/0130189 A1* | 7/2004 | Bohm et al. | | 296/220.01 |

* cited by examiner

*Primary Examiner* — Dennis H Pedder
(74) *Attorney, Agent, or Firm* — Fitch, Even, Tabin & Flannery; John M. Naber

(57) ABSTRACT

A sunroof assembly with a composite water management assembly having side rails with a water trough connected at one end to end caps and to a pair of corners at the other, which connect to a front rail at substantially right angles to the side rails. This composite assembly can be connected by vibration welding. A reinforcement bar can be connected at substantially right angles to the rearward end of vertically oriented slide tracks snap fitted into substantially the length of the side rails. A pair of mirror slide mechanisms with vertically oriented mounts are retained, but free to slide, within a channel of the slide track and outboard of the water trough. A movable panel such as a glass sunroof are attached to the slide mechanism. A sunshade can be added that also combines water shedding ribs to channel water to the water trough.

28 Claims, 22 Drawing Sheets

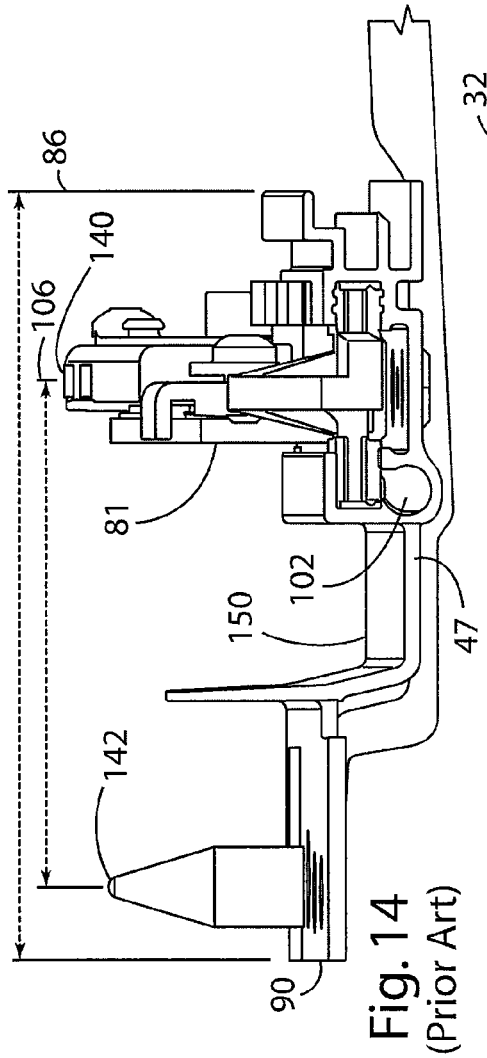
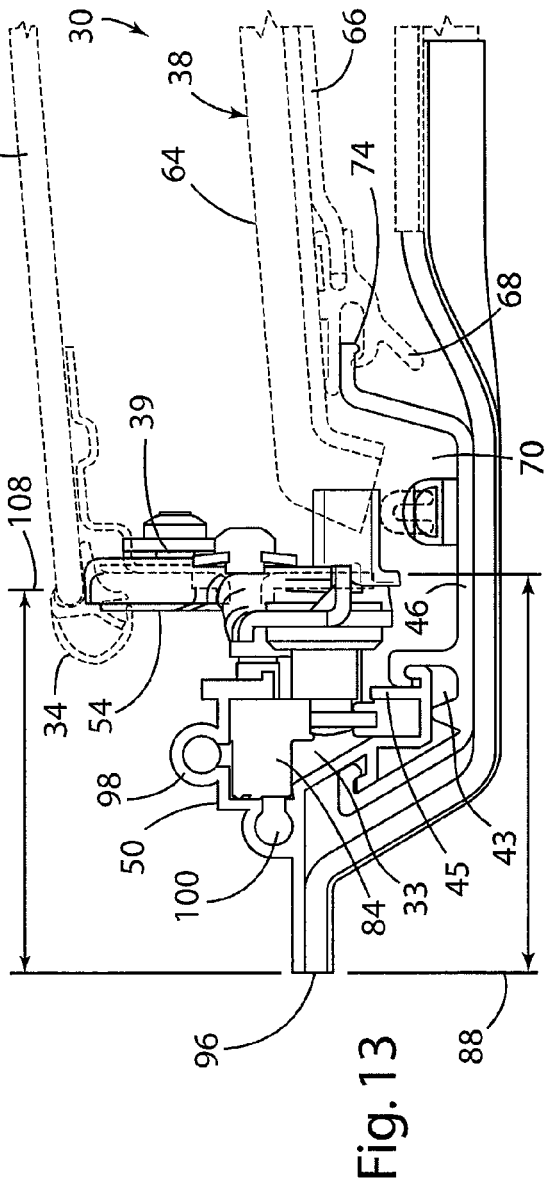
Fig. 14 (Prior Art)
Fig. 13

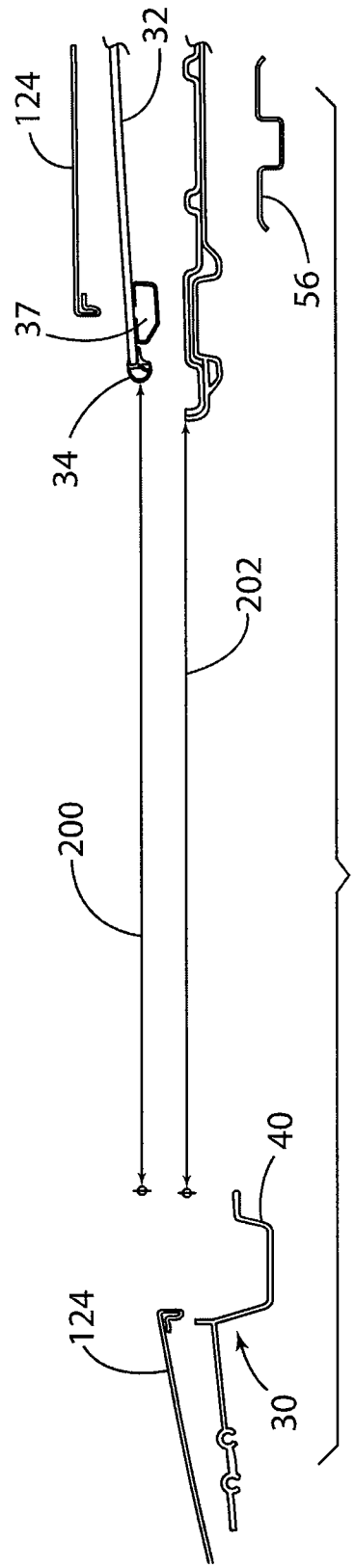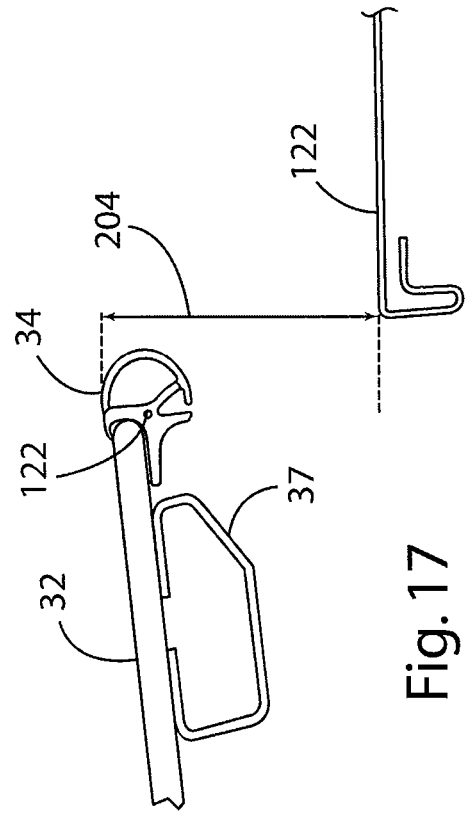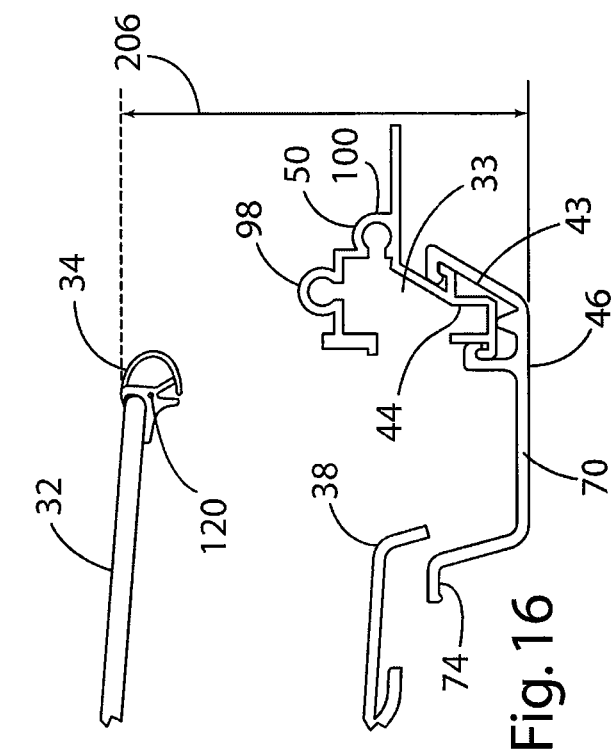

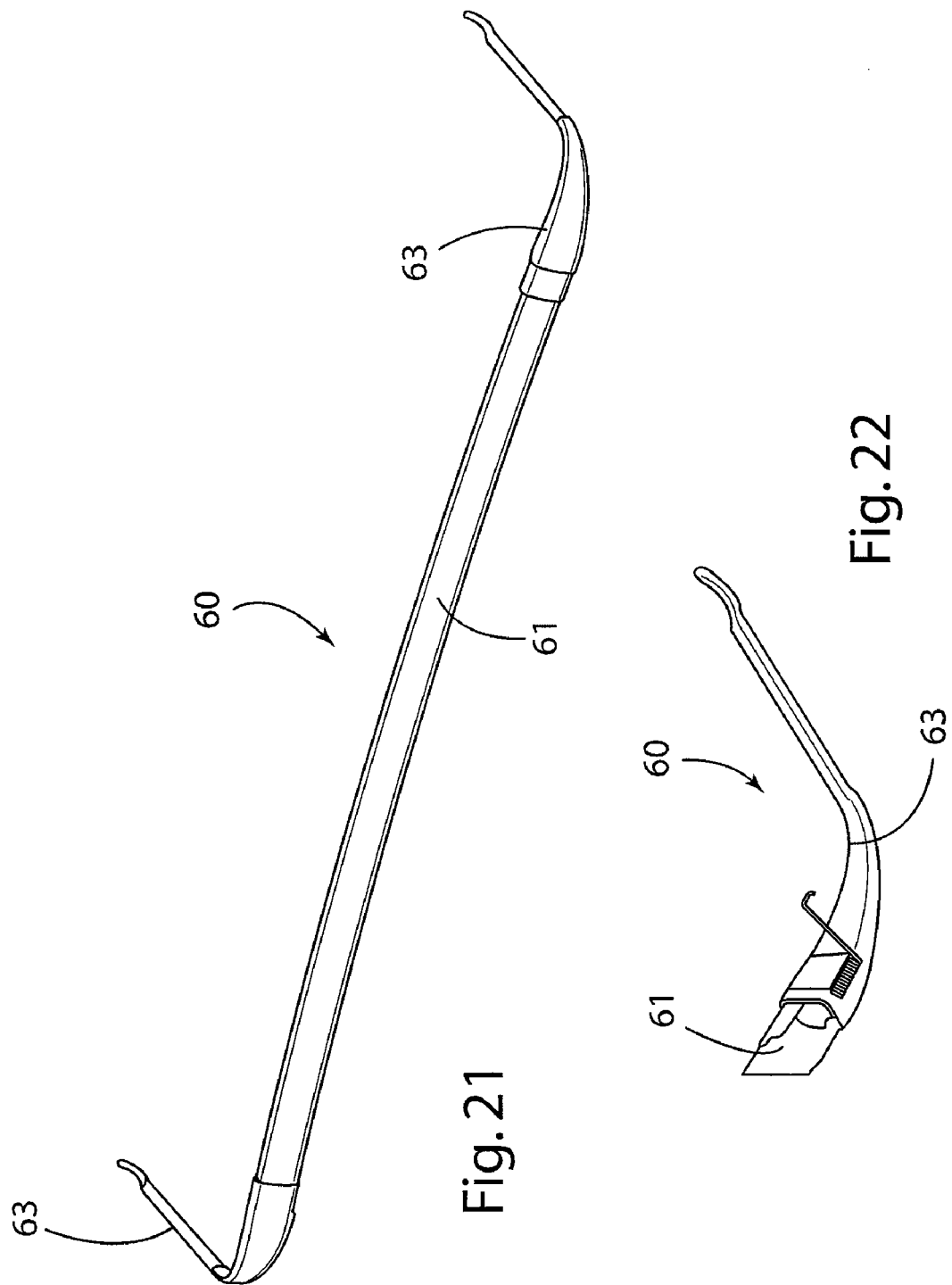

MODULAR TILT SLIDE SUNROOF ASSEMBLY AND METHOD OF MANUFACTURE

FIELD OF THE INVENTION

The present invention generally relates to sunroof applications for an opening of a vehicle, and particularly to a modular tilt slide sunroof that combines features associated with conventional sunroofs, but with fewer parts, more recyclable parts, lighter weight, and adaptability to a variety of applications, sizes and vehicle types to allow increased cost efficiency in manufacturing and decreased time to market.

BACKGROUND OF INVENTION

In the art, sunroofs and other movable surfaces (sunroofs) installed in an opening of a vehicle roof are well known. Through the years, sunroofs have typically been custom developed for a particular vehicle. Also, various mechanisms have been developed to allow the sunroof to move and tilt. These mechanisms also necessitate the need to develop collateral features such as sunshades, frames to maintain vehicle integrity, weather seals, and wind and water management systems. These features also typically require customization to particular vehicle applications. Customization adds to the cost of a sunroof system and ultimately to the cost of a vehicle. A sunroof manufacturer or distributor also typically carries the cost of a large inventory of parts for each of its customized applications, which further increases overall cost and storage space requirements. Further, a custom sunroof application takes time to develop and manufacture, adding delay to implementation and thus overall cost. Also, the amount of time and energy used for the manufacture of a sunroof and the recyclability of its component parts are seldom considered in a sunroof design.

As energy and material costs increase, these negative effects of product customization become more pronounced. Recent attempts, such as found in WEBASTO AG's U.S. Pat. No. 7,441,833 to Pomeroy et al., have begun to address some of these issues. Pomeroy discloses a sunroof assembly that can use some common parts for both a single and double panel sunroof applications.

While these improvements mark a great advance in the art, further advances are possible and desired. For example, use of composite and/or recyclable component parts can reduce overall waste, cost, and weight of a product, thus reducing its 'carbon footprint' through lower manufacturing energy and improved vehicle fuel economy. Further, component parts that can be easily adapted over a variety of applications can reduce manufacturing costs, reduce inventory space, and improve product time to market.

SUMMARY OF INVENTION

Accordingly, the present invention provides a modular tilt slide sunroof that combines features associated with conventional sunroofs, but with fewer parts, more recyclable parts, lighter weight, and adaptability to a variety of applications, sizes and vehicle types to allow increased cost efficiency in manufacturing and decreased time to assembly and to deliver to market.

The present invention provides a sunroof with many improvements over the prior art. A one or two piece sunshade can be made from a composite or plastic polymer. The sunshade can be formed and bonded to include integrated water channeling along its top surface, thus eliminating a need for a separate back edge water trough component as found in the prior art. Further, the sunshade can be simplified in that a fabric material can be eliminated. Alternatively, the plastic or composite sunshade surface facing the interior of the vehicle compartment can be grained or color matched to vehicle interior. Movement of the sunshade along its track can be achieved by a variety of guidance systems, such as a guide, or slide or optionally by a plurality of tabs molded directly into the sunshade. The guidance system can be configured to allow rotational attachment to allow further versatility among vehicle applications.

Also, the mechanisms to move and tilt the sunroof panel are connected to the sunroof assembly by a vertical track. This vertical slide mechanism outboard of water management positioning can provide several engineering advantages, such as reduced track size, unique modular water management, a water-shedding sunshade and reduction in frame size and weight. The movable panel assembly can have a glass panel (sunroof), a seal to block water and dust, and a frame for structure and attachment to the sunroof assembly. The seal can use either metal or an encapsulation material or adhesive tape to attach to the seal. The overall assembly frame can be made from injected molded or extruded composite rails and cross members connected by comparable composite modular corner pieces and end caps. Overall, a four-piece water management frame greatly enhances design and dimensional variation for maximum flexibility.

In one embodiment for the present invention, the sunroof assembly has a composite water management assembly having a pair of parallel side rails having a water trough and a forward and a rearward end, a pair of transitional corners connected to the forward ends of the side rails, a front rail connected to the corners at substantially right angles to the side rails, and a pair of end caps connected to the rearward ends of the side rails; a vertically oriented slide track snap fitted into substantially the length of the side rails; a reinforcement bar connected to the vertical slide track at substantially right angles and oriented toward the middle of the vertical slide track; a pair of mirror slide mechanisms with vertically oriented mounts, retained, but free to slide, within a channel of the slide track and outboard of the water trough; and a movable panel attached to the slide mechanism.

Additional features that can be added to the invention can include a sunshade having guides mounted to, but free to slide on, the side rails, the sunshade having an upper substrate having at least one formed rib, wherein water is channeled to the water trough of the side rails; and optionally a lower substrate that can be colored and grained to match a vehicle interior, and bonded to the upper substrate. Alternatively, the sunshade can be a one-piece construction. Also, in one embodiment, sunshade guidance can utilize a connection having a rotation allowance. This allows for a consistent sliding operation, compensation for system tolerances, and aid in ease of manufacture.

Other additional features that can be added to the invention can include a motor and wear plate attached to the front rail, the motor connected to a power source and controlled by a user activated controller; a first drive cable connected to one slide mechanism and retained, but free to slide, within an outboard cable channel of the water management assembly; a second drive cable connected to the mirror slide mechanism and retained, but free to slide, within an inboard cable channel; the cable channels running the perimeter of the water management assembly including front rail, transitional corners and side tracks; and the cables connected to and moveable by a motive force from the motor through a motor mounted gear.

Other additional features that can be added to the invention can include a wind deflector assembly having a pair of mirror image deflector pivots attached toward the forward end of the side rails, and a wind deflector attached at both ends of the deflector pivots. As with other features of the present invention, the wind deflector allows easy variability in changes in dimensions.

The present invention can be hermetically assembled using friction type welding (such as vibration, ultrasonic, spin, sonic, and the like) since the components of the water management assembly are made from comparable materials.

Other features of the present invention will become more apparent to persons having ordinary skill in the art to which the present invention pertains from the following description and claims.

BRIEF DESCRIPTION OF THE FIGURES

The foregoing features, as well as other features, will become apparent with reference to the description and figure below, in which like numerals represent elements and in which:

FIG. 13 illustrates a planar cut-away view of a vertical track assembly of one embodiment of a sunroof assembly according to the present invention taken along line C-C of FIG. 2.

FIG. 14 illustrates a planar cut-away view of a prior art horizontal track assembly at a comparable position.

FIG. 15 illustrates a planar cut-away view of a frame assembly of one embodiment of a sunroof assembly according to the present invention taken along line D-D of FIG. 2 when the sunroof is fully open.

FIG. 16 illustrates a planar cut-away view of a frame assembly of one embodiment of a sunroof assembly according to the present invention taken along line C-C of FIG. 2 when the sunroof is in a closed position.

FIG. 17 illustrates a planar cut-away view of a frame assembly of one embodiment of a sunroof assembly according to the present invention taken along inverse orientation of line D-D of FIG. 2 when the sunroof is in a fully tilted position.

FIG. 21 illustrates a perspective view of a wind deflector assembly of one embodiment of a sunroof assembly according to the present invention.

FIG. 22 illustrates added detail of a perspective view of a corner of a wind deflector assembly of one embodiment of a sunroof assembly according to the present invention.

DETAILED DESCRIPTION OF THE INVENTION

The present invention provides a modular tilt slide sunroof that combines features associated with conventional sunroofs, but with fewer parts, more parts that are recyclable, lighter weight, and adaptability to a variety of applications, sizes and vehicle types to allow increased cost efficiency in manufacturing and decreased time to assemble and to deliver to market.

The present invention provides a sunroof with many improvements over the prior art. A water shedding one or two piece sunshade can be made of a composite, or a plastic polymer that can be bonded to a structural substrate and formed to include integrated water channeling along its top surface, thus eliminating a need for a separate back edge water trough component as found in the prior art. Further, the sunshade can be simplified in that a fabric material can be eliminated. Alternatively, the sunshade surface facing the interior of the vehicle compartment can be grained or color matched to vehicle interior. Movement of the sunshade along the side rail can optionally be restricted by a plurality of tabs molded directly into the sunshade slide guide. Also, the outboard positioning of the slide mechanisms to move and tilt the sunroof panels are connected to the sunroof assembly by a vertical track. This positioning can provide several engineering advantages, such as reduced parts for water management and reduction in part size, thus a resultant reduction in frame size and weight, thus allowing increase in a daylight opening. The sunroof panel assembly can have glass panels, a seal (such as a tape on seal), or either metal or an encapsulation material to attach to the seal. A modular four piece frame can be used to attach the panel to the assembly. The overall assembly frame can be made from injected molded and/or extruded composite rails and cross members connected by comparable composite modular corner pieces and end caps. One advantage of the use of extruded components is that they can be merely cut to a desired length to accommodate a variety of applications and dimension. These components can be assembled using a variety of methods including various types of friction welding to create a watertight sealed joint that does not require application of adhesives or sealers or fasteners that are typically found in the art. The reinforcement assembly can be made from a roll form center component which is cut to a desired length and stamped end pieces, which allows adaptability to multiple sunroof sizes.

Figure 1:
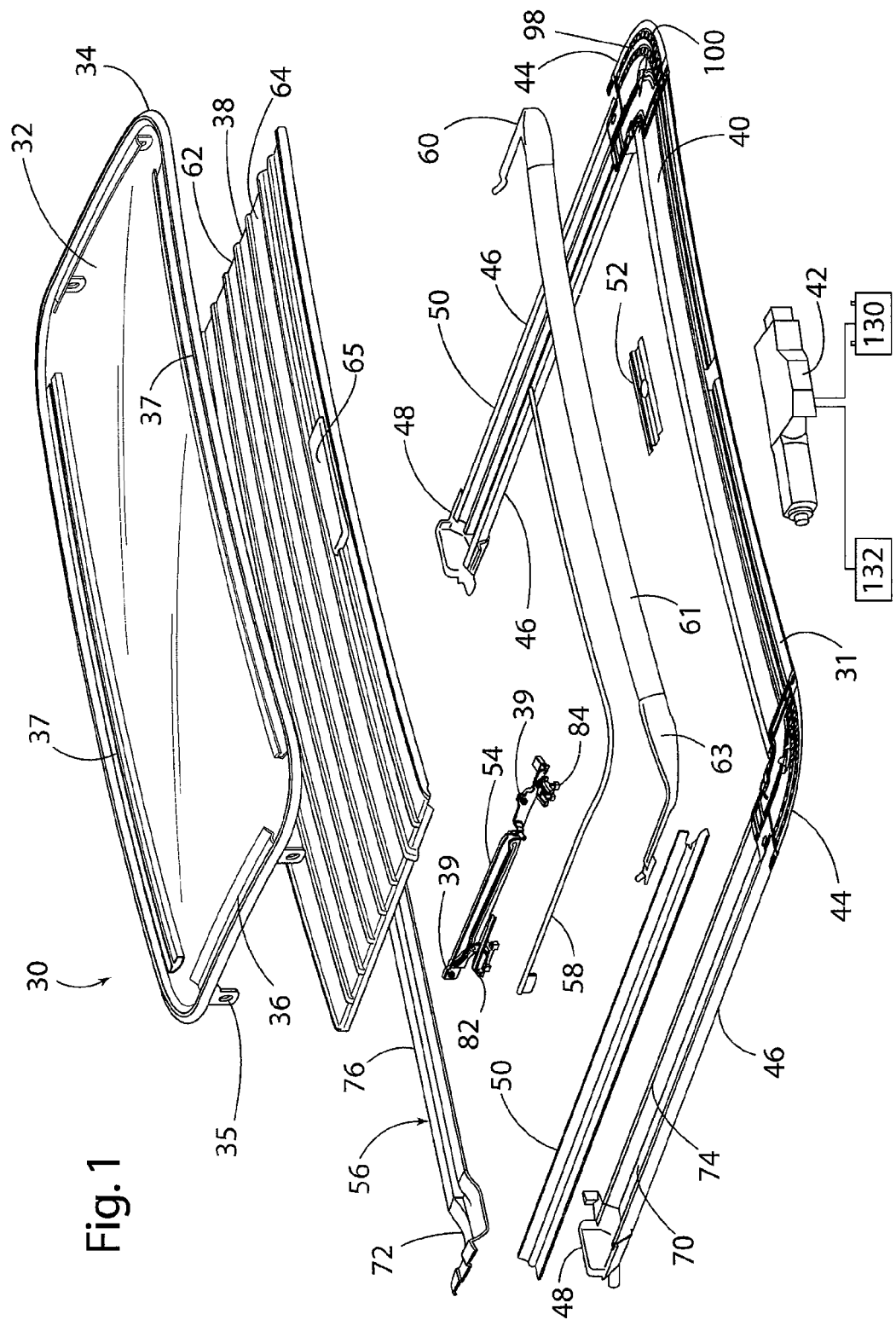
FIG. 1 illustrates an exploded front perspective view of one embodiment of a sunroof assembly according to the present invention.
Figure 2:
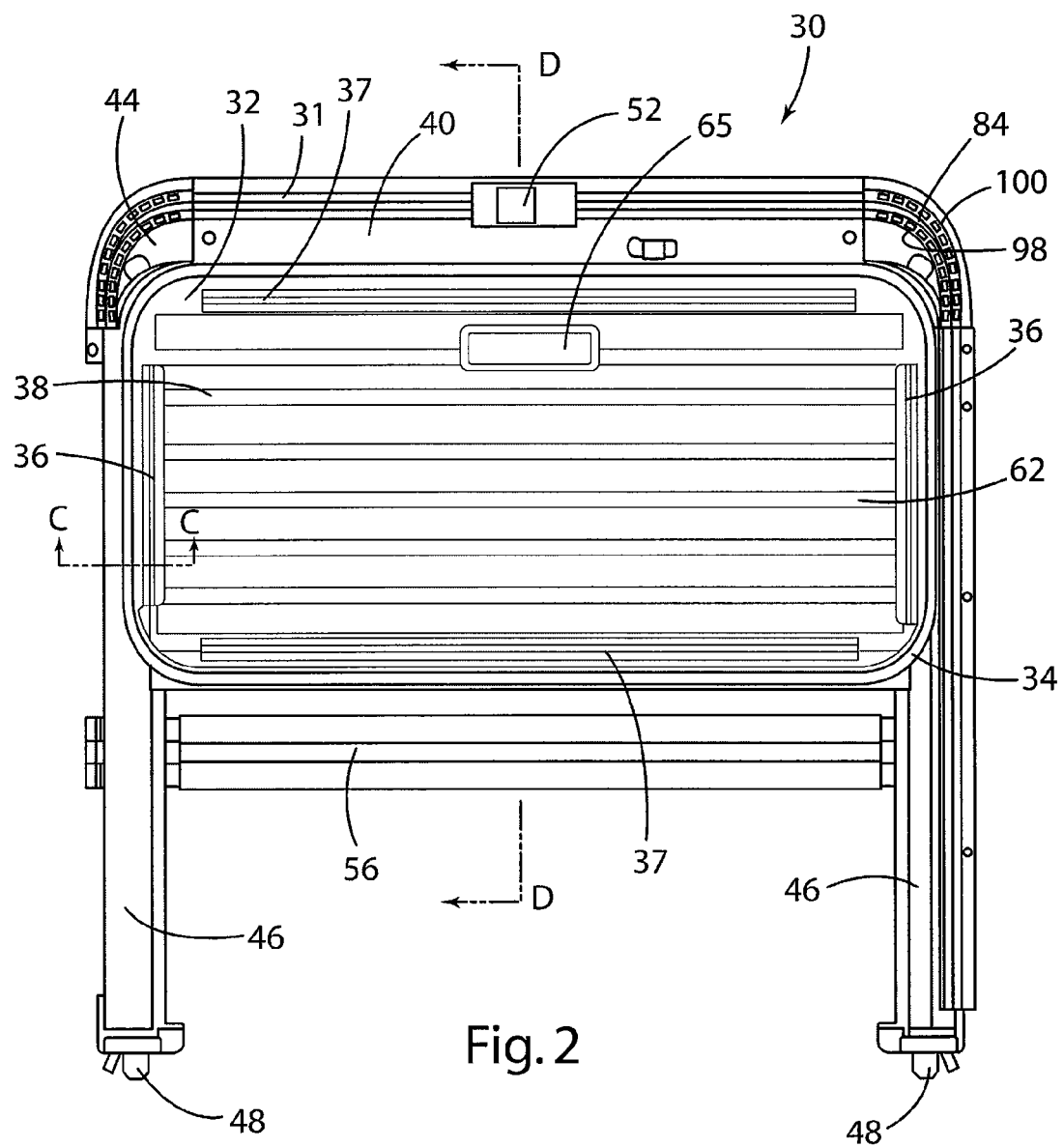
FIG. 2 illustrates a top view of one embodiment of a sunroof assembly according to the present invention.

As shown generally at 30 in FIGS. 1-2, the present invention sunroof assembly has the basic components of a sunshade, a vertically mounted sliding track mechanism, movable roof panel (sunroof/glass panel), and a composite modular frame forming a water management assembly. As best seen in FIG. 1, the present sunroof assembly 30 can have several components including at least a glass panel 32 with a tape on seal 34 and four sunroof frame components: two side reinforcement brackets 36 having tabs 35 which can be used to attach glass panel 32 to a pair of mirror image vertically mounted slide mechanisms 54 (one shown); and front and rear reinforcements 37 running the width of the sunroof. Reinforcements 37 can be roll formed for length modularity for use across multiple vehicles. Sunroof assembly 30 can also have a sunshade 38, an extruded front rail cross member (front rail) 40, a motor 42, a pair of integrated molded transitional corners (corners) 44 (that can be configured as left side/right side or in some applications as mirror images), a pair of side rails 46, a pair of mirror image end caps 48, a pair of vertical slide tracks 50 to retain vertical slide mechanisms 54 within a channel 33, a wear plate 52, a pair of mirror image vertically mounted slide mechanisms 54 (one shown), a three piece reinforcement bar 56, cables 58 (one shown), and a wind deflector assembly 60. Each component of sunroof assembly 30 has several features to address the objects of the invention to reduce weight and cost while improving recyclability and functionality. The overall sunroof assembly is configured to fit within a headliner 96 of a vehicle cabin ceiling. For purposes of this description, use of the term 'retain' as it relates to vertical slide mechanisms 54 within vertical slide tracks 50, means that while it is retained within channel 33, it is also free to slide within channel 33.

Sunshade

A common feature of most sunroof assemblies is to provide a sunshade to shield the light from a glass sunroof when desired by a user and to provide an interior trim close-out. One other aspect of a typical sunroof assembly is to provide water shedding features for water that, for whatever reason, passes through a roof opening. In the prior art, this can be a plastic or metal trough displaced under a sliding track mechanism for the sunroof. The water shedding feature of the present invention sunshade can be achieved by changing the geometry of the rail over conventional sunshades. For example, as shown, sunshade 38 can utilize its top surface (upper substrate 64) as a water channeling element. The addition of ribs 62 to the sunshade is a combination that eliminates the need for a water trough (described more fully below), thus reducing the overall number of parts needed for the system. Further, since the water trough carries the sunshade, a shorter track length can be achieved over the prior art.

Figure 6:
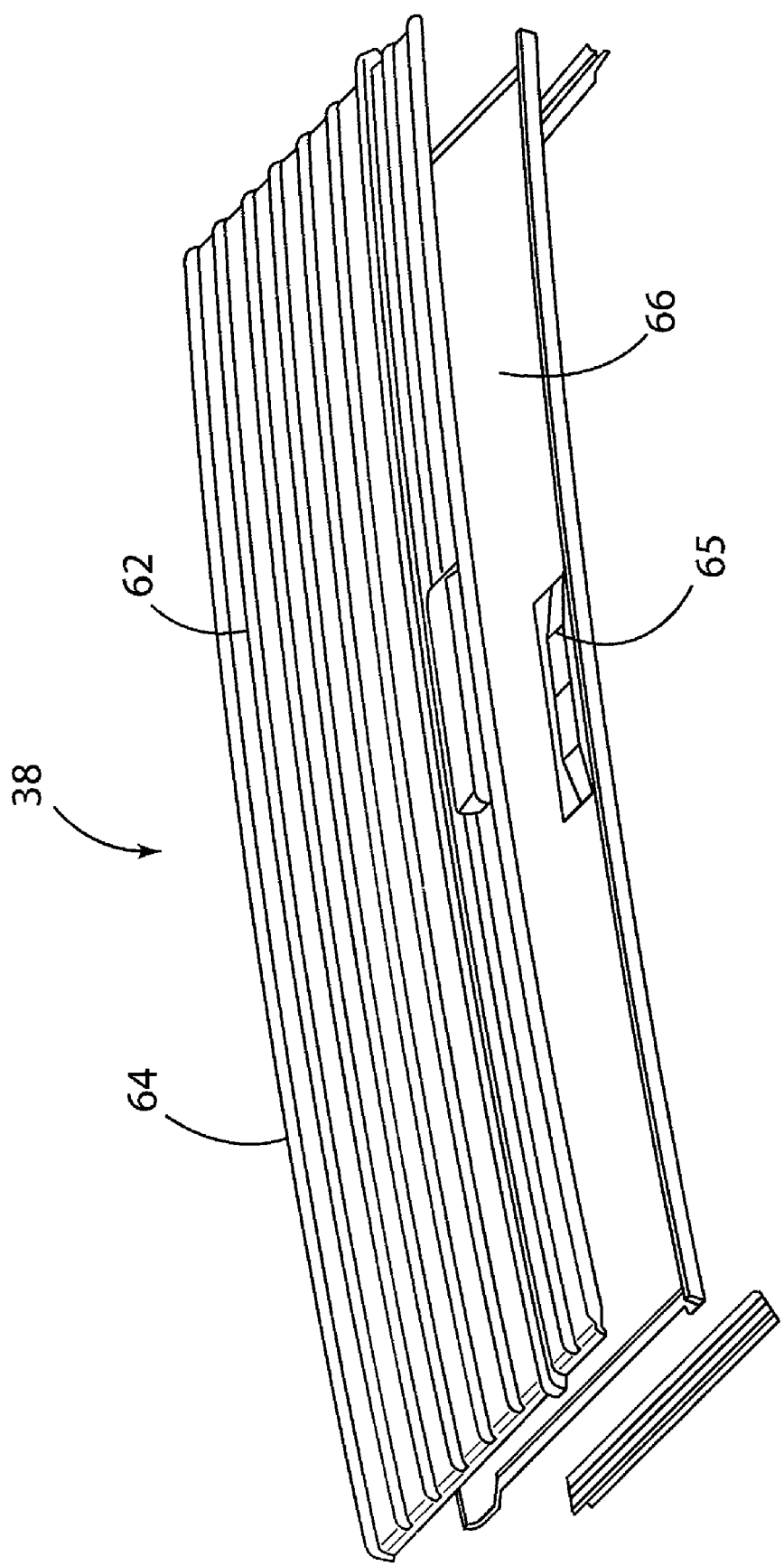
FIG. 6 illustrates an exploded perspective top view of a sunshade assembly according to the present invention.
Figure 7:
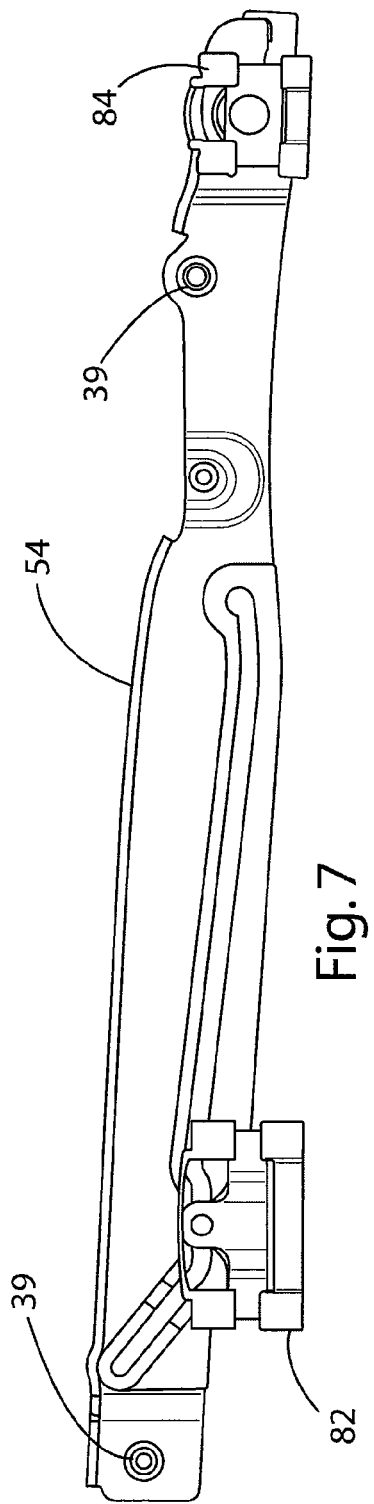
FIG. 7 illustrates a side view of a vertical slide mechanism of one embodiment of a sunroof assembly according to the present invention.
Figure 9:
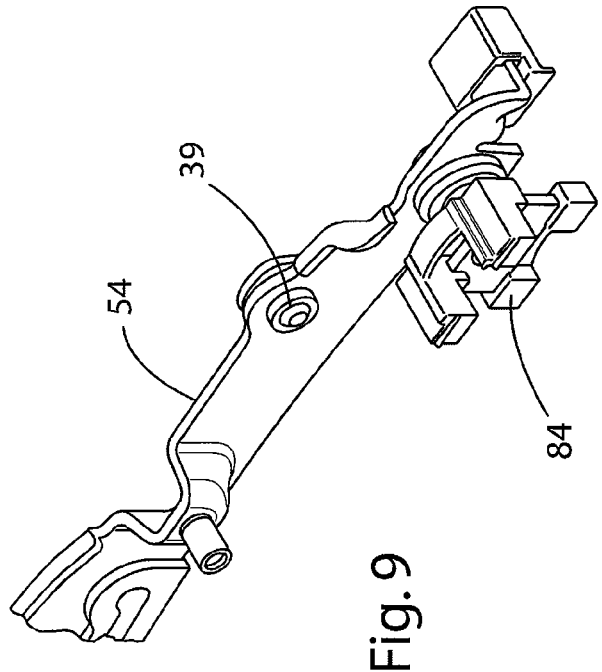
FIG. 9 illustrates a perspective view of a second end of a vertical slide mechanism of one embodiment of a sunroof assembly according to the present invention.
Figure 8:
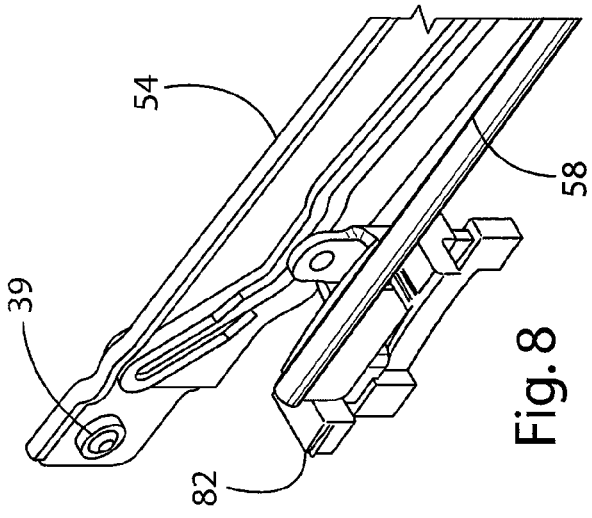
FIG. 8 illustrates a perspective view of one end of a vertical slide mechanism and drive cable of one embodiment of a sunroof assembly according to the present invention.
Figure 10:
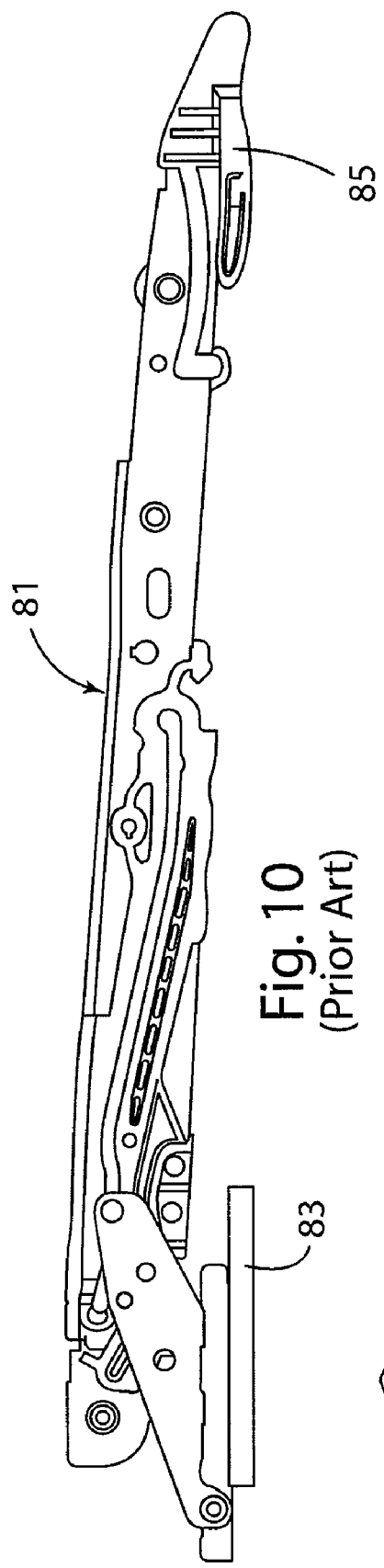
FIG. 10 illustrates a side view of a prior art horizontal track mechanism.
Figure 12:
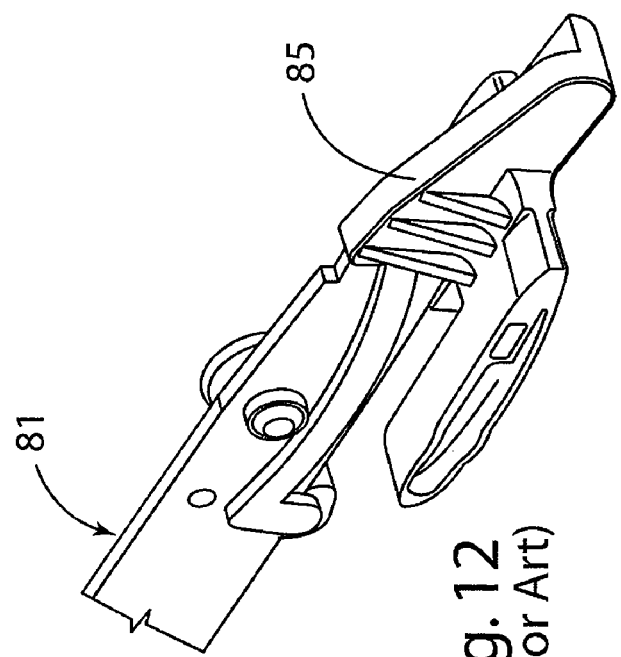
FIG. 12 illustrates a perspective view of a second end a prior art horizontal track mechanism.
Figure 11:
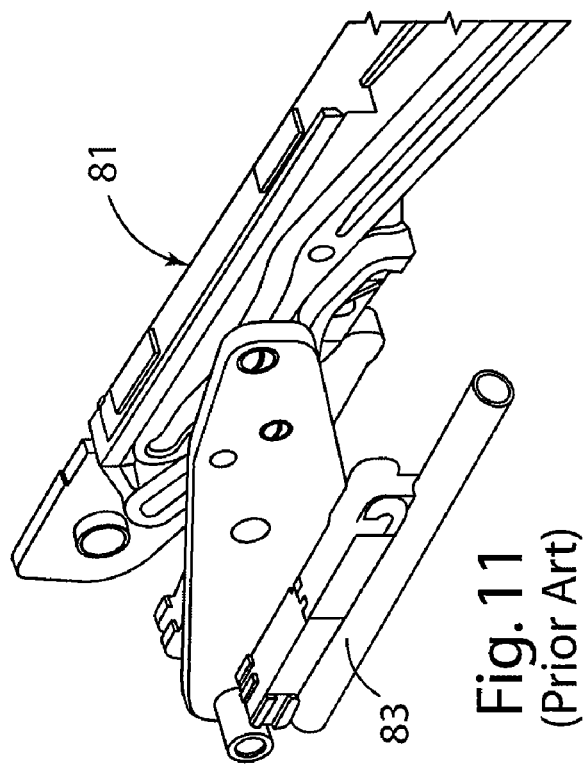
FIG. 11 illustrates a perspective view of one end a prior art horizontal track mechanism.

A sunshade also typically has a fabric to match the material and fabric found on the ceiling of a vehicle cabin. In the present invention, as shown in FIG. 6, sunshade 38 can instead have a polymer lower substrate 66 that can be molded to match a vehicle interior grain and/or color. By eliminating the use of a custom fabric, which requires additional manufacturing steps to match the headliner fabric of the vehicle, assembly steps and costs are eliminated. The present sunshade lower substrate 66 can be bonded to the structural upper substrate 64 or attach by any means known in the art. The substrates can be bonded by an adhesive such as one sold under the brand name PLEXUS MA 300 (not shown, but known in the art), welded by vibration, sonic or high frequency waves. Substrates 64 and 66 can be made of a plastic or other composite material. Upper substrate 64 can be vacuum formed PC/ABS or other composite sheet. Bonding upper substrate 64 to lower substrate 66 increases stiffness. Sunshade 38 should be heat stabilized and UV resistant to function in an automotive environment. Lower substrate 66 can also be ABS sheet vacuum formed and can have added texture (grained) or color added if desired. Optionally, fabric can be added to cover lower substrate 66 (not shown). Also, an integrated pull cup 65 can be formed into lower substrate 66 or formed separately and installed to a preformed opening.

Figure 4:
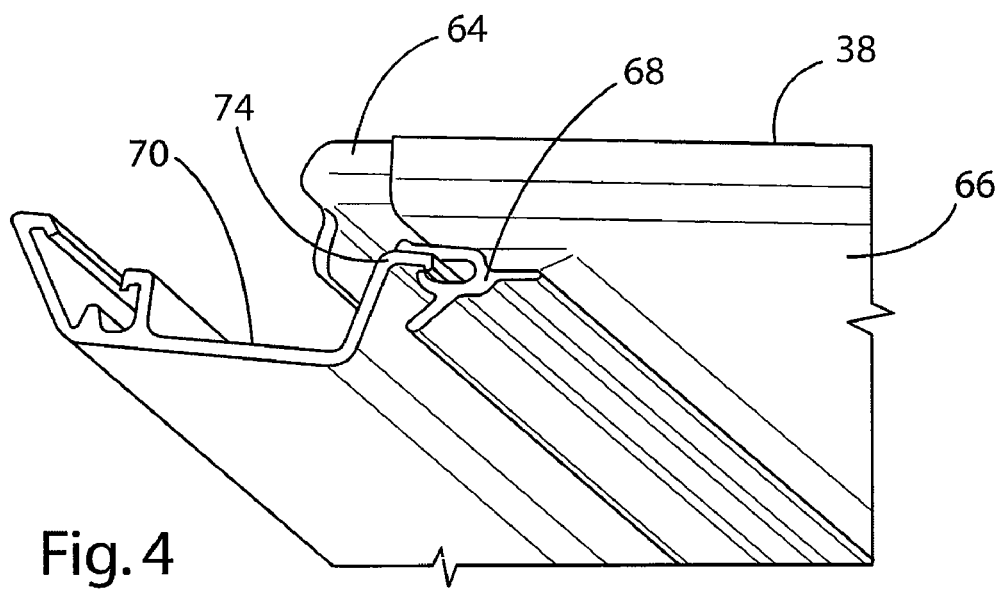
FIG. 4 illustrates a partial perspective cut-away view including a sunshade and water management assembly of one embodiment of a sunroof assembly according to the present invention taken along line B-B of FIG. 3.
Figure 5:
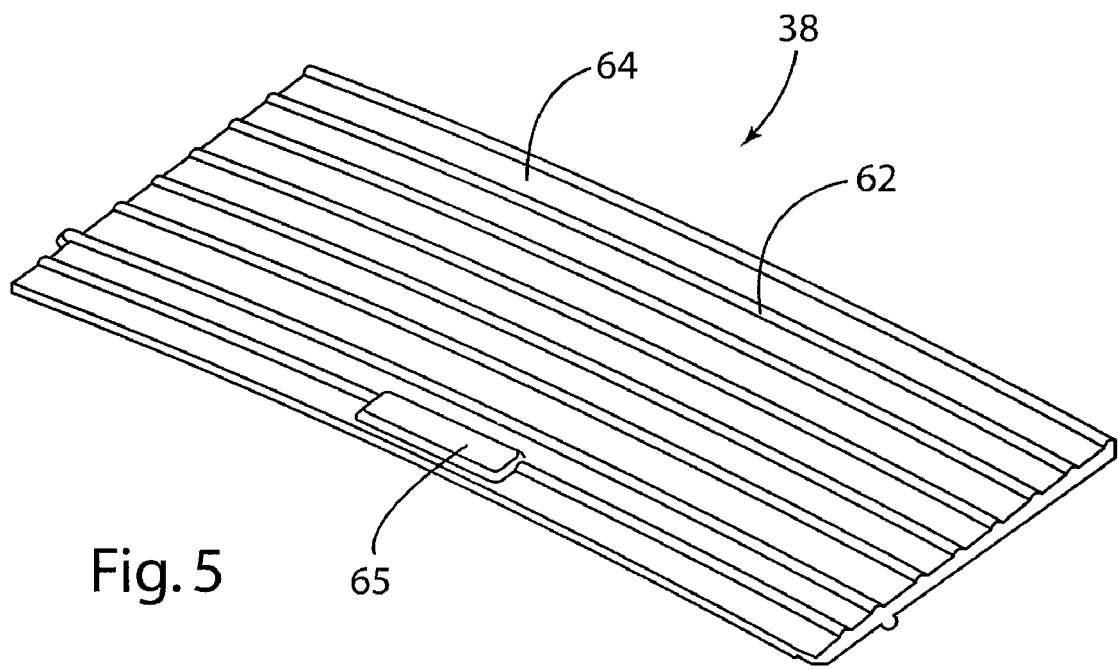
FIG. 5 illustrates a perspective top view of a sunshade of embodiment of a sunroof assembly according to the present invention.

Sunshade 38 of the present invention has a sliding capability, as is typically found in the art. To hold the sunshade in a desired position, a resistive force must be in place. As shown in FIGS. 4 and 6, sunshade 38 can have a sunshade guide 68 configured to be disposed above and below a side rail inner edge 74 to provide a clamping force on the inner edge 74. Thus, sunshade 38 is configured to be attached, but free to slide along the length of the inboard side rail inner edge 74. Sunshade guide 68 can be integral with or bonded to lower substrate 66. Where guide 68 is an integral piece, further product cost reduction is achieved.

Figure 23:
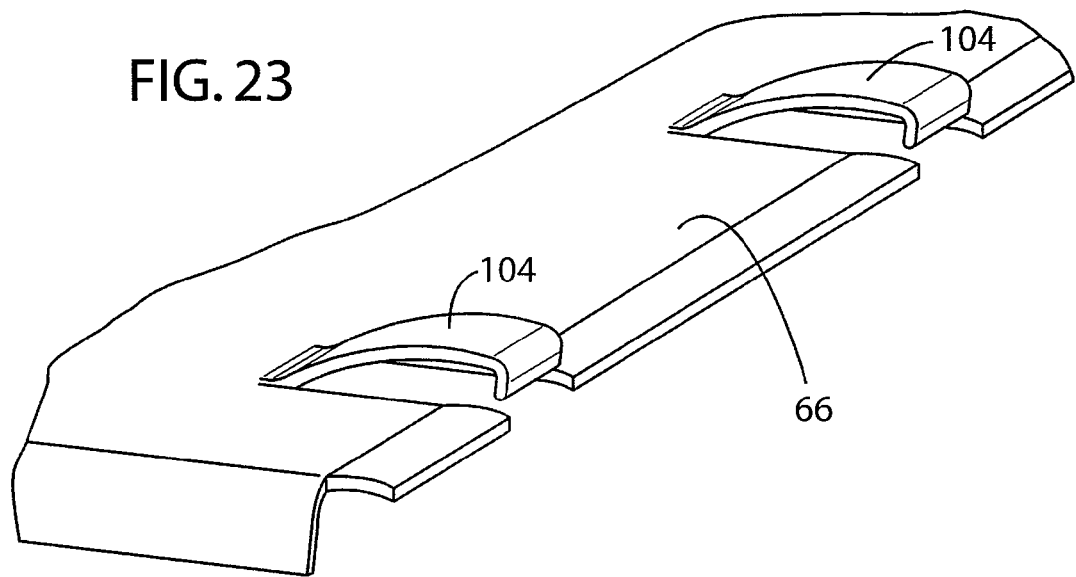
FIG. 23 illustrates a top perspective view of a sunshade of an alternate embodiment of a sunroof assembly according to the present invention having tabs to resist movement with the water trough.
Figure 24:
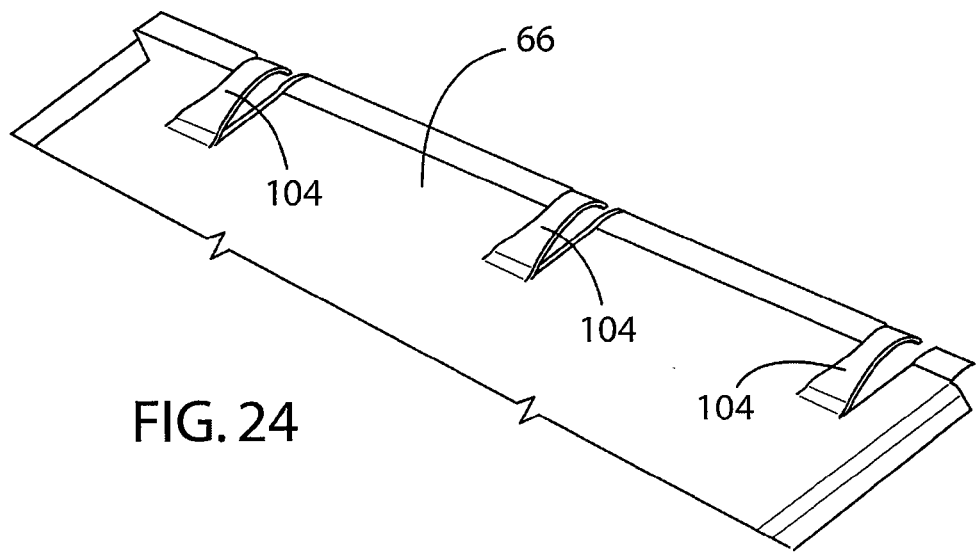
FIG. 24 illustrates a bottom perspective view of a sunshade of an alternate embodiment of a sunroof assembly according to the present invention having tabs to resist movement within the track.

Other embodiments are possible. In one alternate embodiment, shown best in FIGS. 23-24, lower substrate 66 can have a plurality of tabs 104 to provide a clamping effect to the side rail inner edge 74. The resistive effort of the slideability of sunshade 38 can be easily tuned to specific requirements by thinning or thickening the wall of the side rail inner edge 74, as shown in FIG. 4. Also, as shown in the alternative embodiment of FIGS. 23-24, tabs 104 can be of various dimensions, such as 20 mm wide and spaced approximately 100 mm apart.

Figure 3:
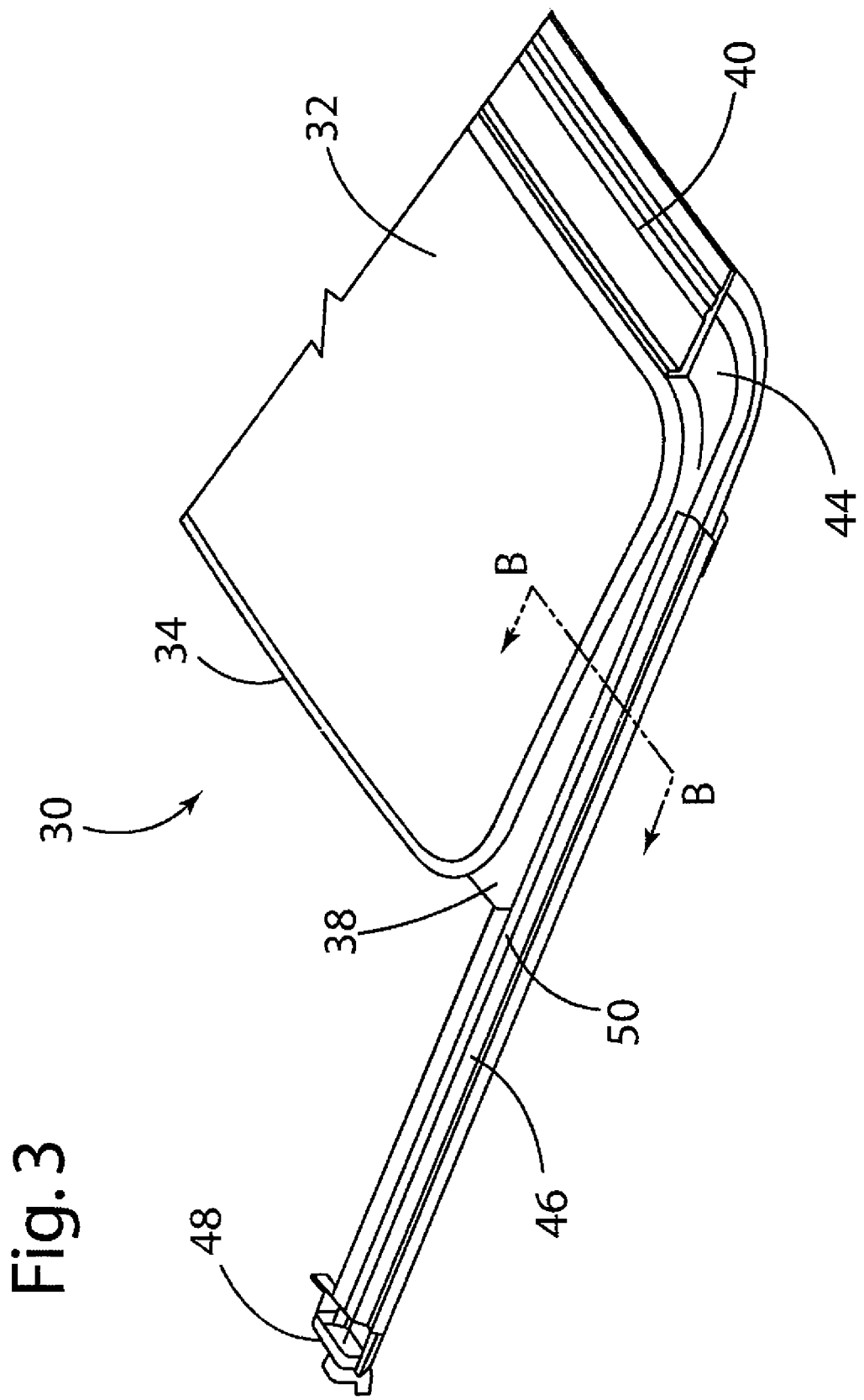
FIG. 3 illustrates a partial view of an assembled front perspective view of a sunroof assembly according to the present invention.

As briefly described above, sunshade 38 can provide a dual purpose of not only shading sunlight, but also water management. As shown in FIGS. 3 and 4, sunshade 38 can have ribs 62 on upper substrate 64 that can channel water to side rail water trough 70. Further, an added benefit of ribs 62 is increased component stiffness.

Figure 30:
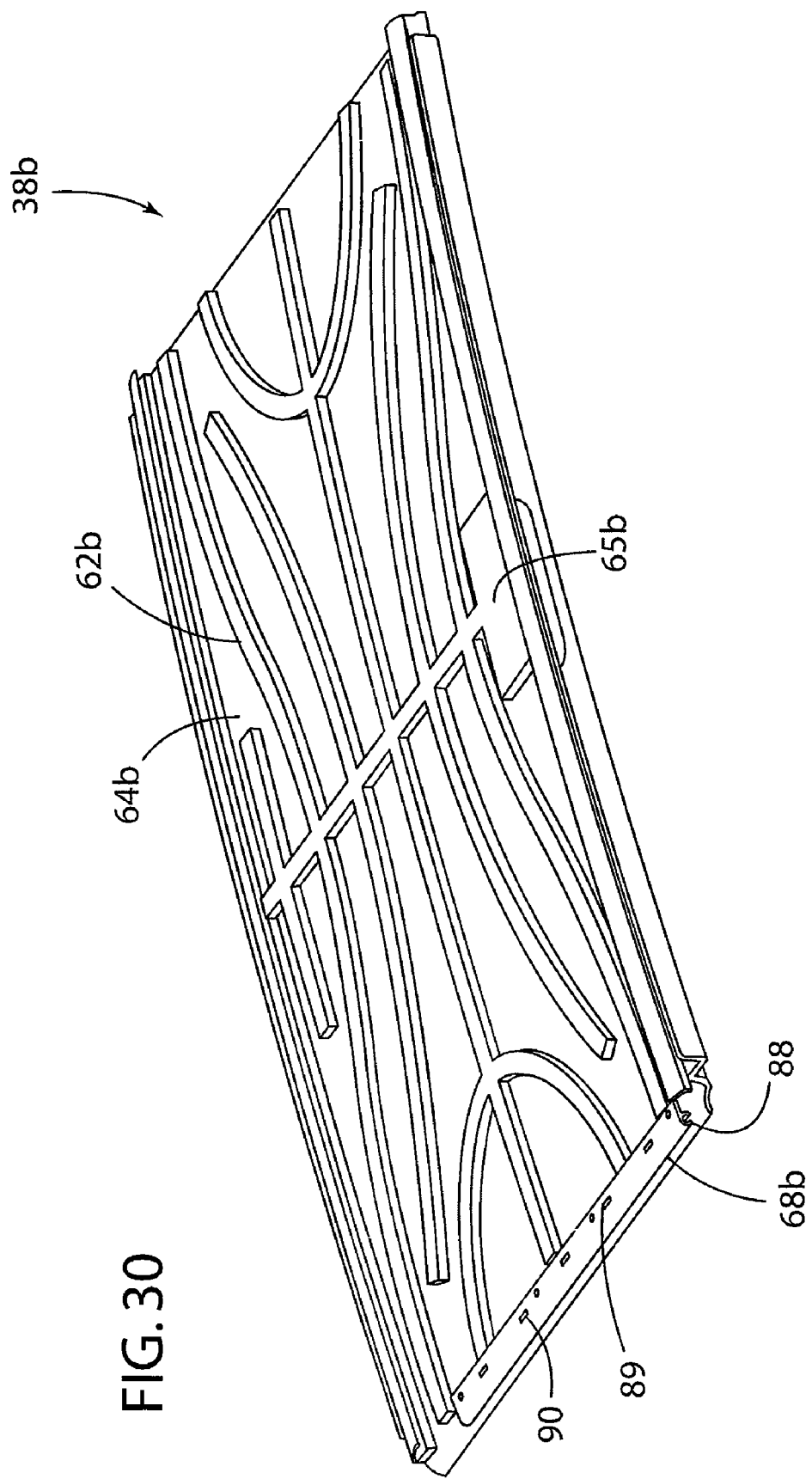
FIG. 30 illustrates a top perspective view of an alternate embodiment of a water-shedding sunshade according to the present invention.
Figure 31:
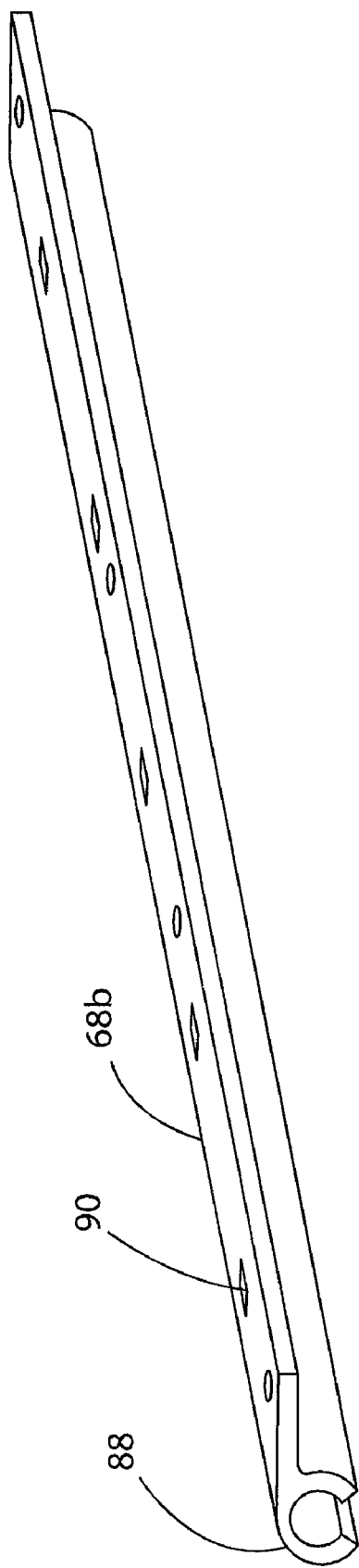
FIG. 31 illustrates an alternate embodiment of a sunshade guide according to the present invention.
Figure 32:
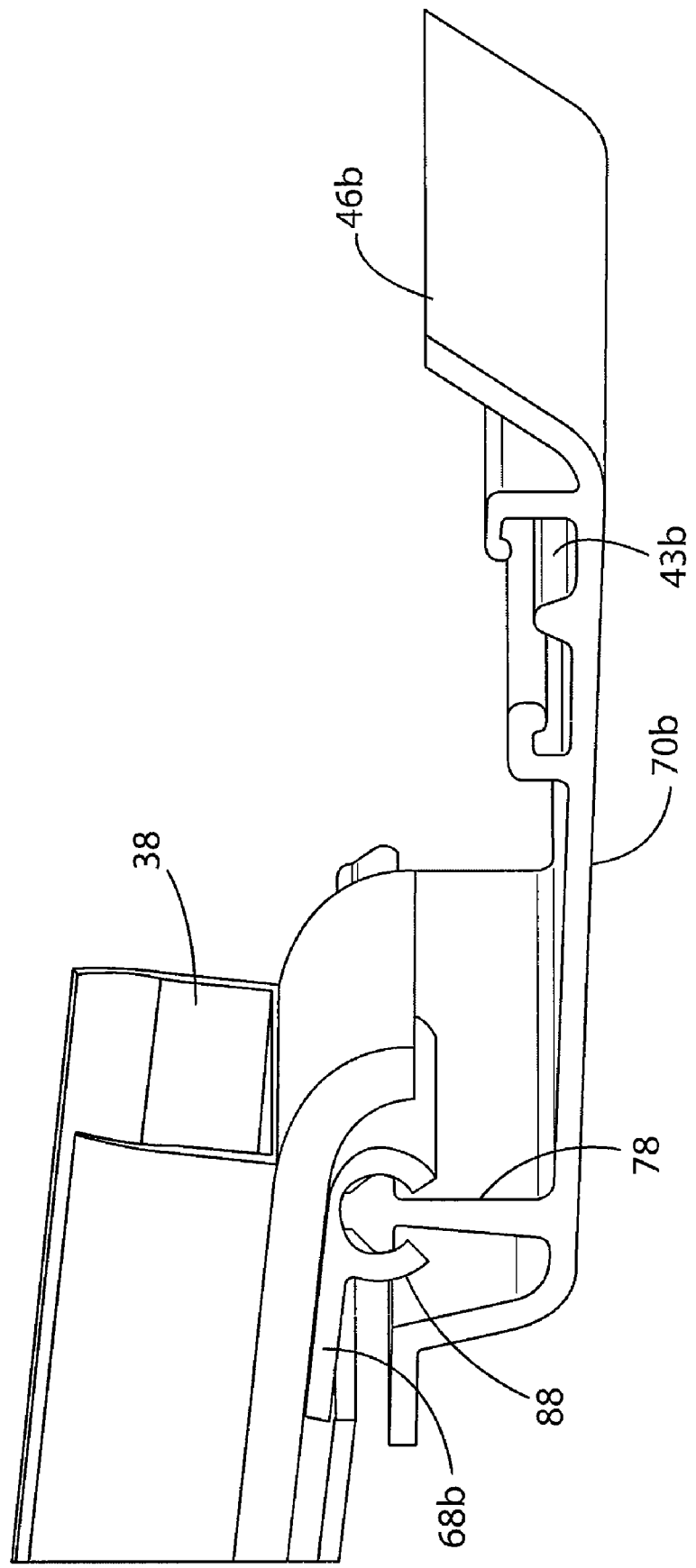
FIG. 32 illustrates a perspective view of the alternate embodiment of a water-shedding sunshade according to the present invention in FIG. 30.
Figure 33:
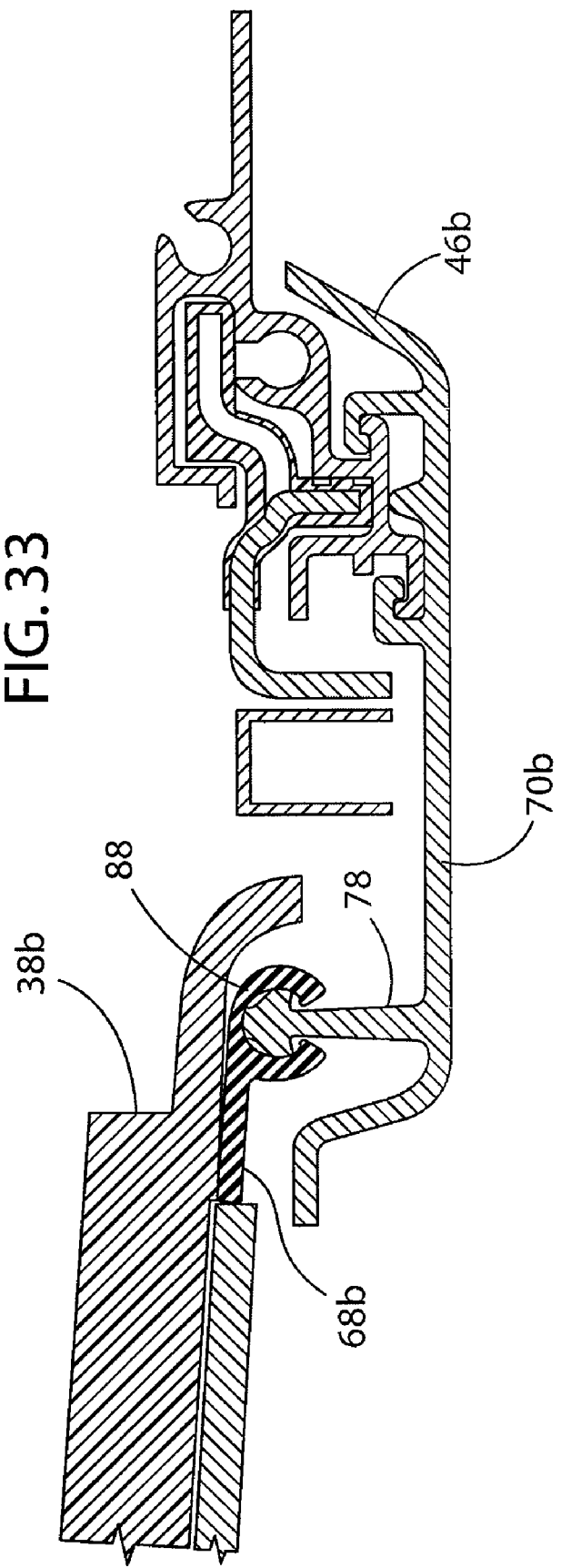
FIG. 33 illustrates a cross section of the alternate embodiment of a water-shedding sunshade guide attached to a slide rail trough according to the present invention in FIG. 30.
Figure 34:
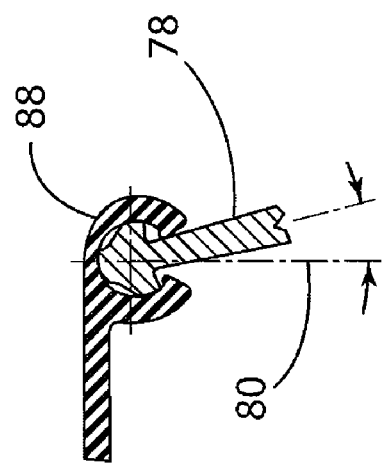
FIG. 34 illustrates a cross section of the alternate embodiment of a water-shedding sunshade guide attached to a slide rail trough according to the present invention in FIG. 30 showing its rotational allowance.

Another embodiment of a sunshade within the present invention is illustrated in FIGS. 30-34. As shown in FIG. 30, sunshade 38b according to the present invention can have multiple rib 62b configurations to channel water. Also, the connection to the side rails can allow for rotation of sunshade 38b relative to the side rails 46. As shown in the figures, this allowance is achieved by a adding a sunshade mount 78 on side rail 46. Further, sunshade guide 68b is modified to be retained along the length of sunshade mount 78 by a rotational guide 88 in a manner that, as illustrated, allows for sliding sunshade 68b along sunshade mount 78 in a manner that allows a rotational allowance about mount 78. As shown in FIG. 34, this rotational range (shown at 80) can be up to 15 degrees.

As shown, this embodiment allows a sunshade guide with the rotational allowance to be snap fitted into the side rails. The snap-on force, pull-off retention force, and sliding and retention force can all be controlled by tuning the relevant features of the rotational guide. The guides can be processed by extrusion, and thus overall guide length can be adjusted for functionality. Spring metal clips 89 can optionally be installed into the assembly at specified positions, such as at recess windows 90, and configured for sliding and retention control along the guide. The rotational allowance in the guides provide for consistent sliding forces over an expected range of side rail 46 variability. In the art, guides have accounted for this variance using a lateral movement between the guide feature and its supporting rail feature. One known failure mode in the art has been an excess of this side to side movement. Each rotational guide in the present invention is in contact at several points laterally, thus limiting this side to side movement. In this embodiment, the side rails need to be manufactured from a compliant material, and thus is not known in the art. The present embodiment facilitates top-down snap-in assembly, while maintaining control of several functional forces.

Thus, advantages of this sunshade design over the prior art can be the ease of installation and removal of the sunshade from the middle of the sunroof. Sunshade 38 provides an improvement over the prior art given its reduced part content, reduced failure modes, and improved cost, time and energy to manufacture.

Vertical Track and Mechanism

In conventional sunroof designs, horizontally oriented mechanisms and slide tracks are used to slide open and close, and tilt a sunroof. As shown in FIGS. 10-12 and 14, a horizontally mounted mechanism 81 is configured to be mounted within but free to slide within the horizontal track 47 by a horizontally oriented forward car 85 and rearward car 83. Horizontal track 47 is typically made of extruded aluminum and provides rigidity to a sunroof module, though at the expense of the added weight and cost. As shown in FIG. 14, at dimension 86, horizontal track 47 is significantly wider than the comparable dimension 88, which can be approximately 40 mm, of the present invention as shown in FIG. 13. For example, dimension 86 can be 86 mm, compared to 40 mm for dimension 88.

Figure 27:
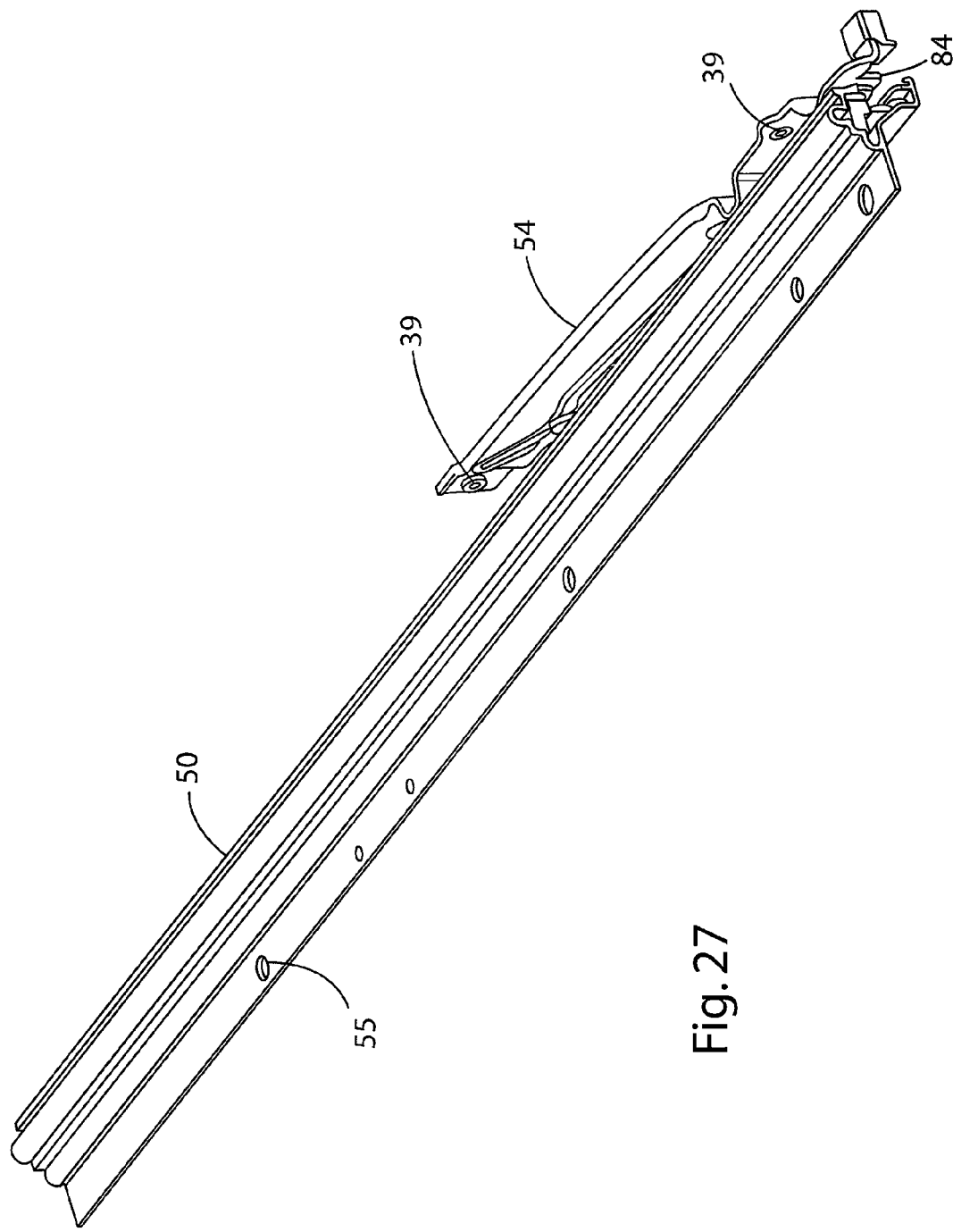
FIG. 27 illustrates a top perspective view looking rearward of a vertical slide track with an installed vertical slide mechanism of one embodiment of a sunroof assembly according to the present invention.
Figure 28:
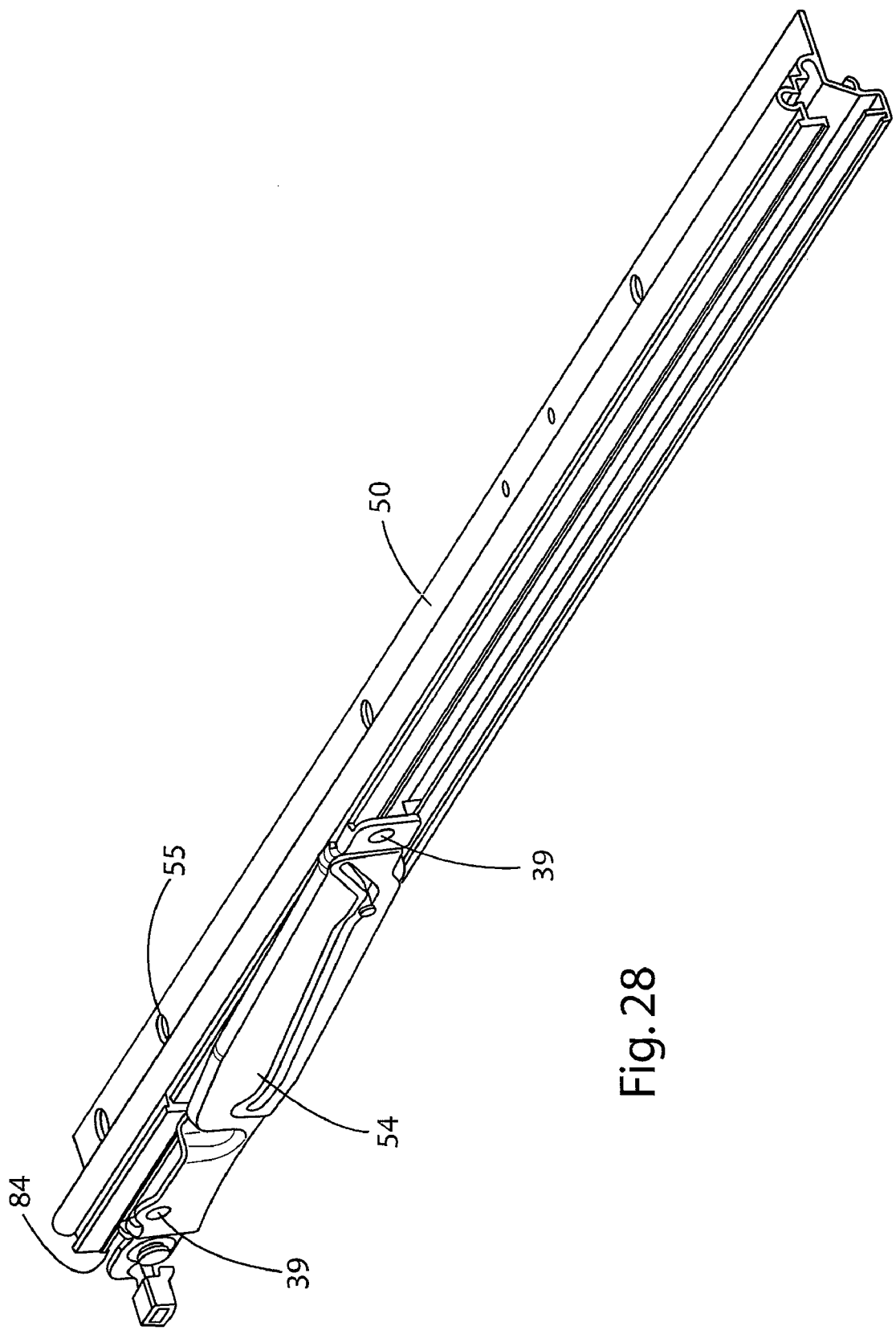
FIG. 28 illustrates a top perspective view looking forward of the vertical slide channel with an installed vertical slide mechanism of one embodiment of a sunroof assembly according to the present invention.

This reduced dimension of the present invention is achieved by removing forward car 85 (FIG. 12) and rearward car 83 (FIG. 11) from horizontal mechanism 81 and adapted it to become a vertical slide mechanism 54 having sliding cars vertically oriented to be retained in vertical slide track 50, which is retained within channel 33. To achieve this, vertical slide mechanism 54 (functionally equivalent to horizontal track mechanism 81) has a forward car 84 and rearward car 82, shown in detail in FIGS. 7-9, 13, 27-28. Cars 82 and 84 are mounted to the side of vertical slide mechanism 54 and adapted to slide within vertical slide track 50. FIGS. 27-28 illustrate the slide mechanism retained within vertical slide track 50. Vertical slide track 50 also is configured to attach to side rail 46 by a snap fit. For illustration purposes only, one such snap-fit is shown in the figures, namely 13, 16 and 32, including a side rail snap fit channel 43 is configured to receive vertical slide track snap fit mount 45. Vertical slide mechanism 54 has mounting points 39 that can be used to attach glass panel 32 to sunroof assembly 30 at side reinforcement bracket tabs 35. Mounting point 39 and tabs 35 can be held together by means known in the art such as a nut and bolt, or an extruded and threaded hole in the mechanism arm. Further, vertical slide track 50 can have mounting points 55 that can be used to attach sunroof assembly 30 to a vehicle. Vertical slide track 50 can be made of extruded aluminum and snap fitted into side rail 46 during assembly (see FIG. 16).

In comparison to the prior art mechanism of FIG. 14, the horizontal orientation of the slide mechanism adds packaging width to the overall sunroof module under the glass panel, compared to the present invention (see FIG. 13). The prior art horizontal systems included the need for additional water channeling management components to be outboard of this mechanism channel, which in turn, necessitates the need for an outboard water trough 150. The orientation of the water trough is determined by the location of the edge of the sunroof. In the present invention, the orientations of the edge of glass panel 32, vertical slide track 50 and vertical slide mechanism 54 allow the sliding mechanism to slide in a channel 33 that is outboard of the water management (side rail water trough 70) as shown in FIG. 13. Thus, the advantages of the present system allows for a reduced track cross section to be that of the mechanism channel only. The water management channel can thus be made of a material other than a structural material (such as steel or aluminum framing). As such, extruded composite compositions for the modular frame are possible. As illustrated, vertical slide mechanism 54 has common mirror image parts for the alternate sides of the module.

Also, as shown in FIG. 14, the mass load of glass at 140 is far inboard from a mounting point (locator pin) for the sunroof module to the vehicle. Dimension 106, can be for example on average between 63 and 65 mm. This prior art configuration requires a stronger framework to maintain functional integrity. The added materials, such as aluminum, in horizontal track 47 to add the needed strength and stiffness also increase overall component cost. As shown in FIG. 13, vertical slide track 50 and vertical slide mechanism 54 mass concentration are also closer to the mounting point on glass panel 32 compared to the prior art example of FIG. 14. As shown, vertical slide mechanism 54 can have a dimension 108 that can be approximately 46 mm, or approximately a 17 mm reduction in cross car dimension.

Nevertheless, despite the vertical orientation of the track and mechanism, the functionality in kinematics of a conventional tilt/slide sunroof mechanism is preserved. The orientation of glass panel 32 to a vehicle roof 124 in various positions is shown in FIGS. 15-17. FIG. 15 shows glass panel 32 in a fully open (taken in cross section along line C-C of FIG. 2) position as defined by dimension 200, which can be approximately 353 mm (compared to 315 mm found in the prior art, hereinafter namely a sunroof sold under the trade name WEBASTO D258), and greater than module opening dimension 202, which can be approximately 336 mm, (compared to 319 mm found in the prior art). In a fully titled (or vented) position, glass panel 32 can be raised a dimension 204, which can be approximately 32 mm (which is comparable to the prior art) above vehicle roof 124. FIG. 16 shows the depth of sunroof assembly 30 as dimension 206, which can be 70 mm (compared to 60 mm found in the prior art An additional feature of the present invention sunroof mechanism is the use of double cable channels 98 and 100 within the perimeter of water management assembly 312 used to retain the cables used to drive vertical slide mechanism 54. Each cable 58 is contained, but free to slide, within its own channel throughout its travel. One cable travels inboard cable channel 98, while the other travels in outboard cable channel 100.

In use, motor 42 is configured to drive dual cables 58, which are also attached to vertical slide mechanism 54. Motor 42 can be powered by an electrical source 130 (for example, a battery or vehicle alternator). Thus, in response to a command from a controller 132, motor 42 can be actuated to drive glass panel 32 to a desired position.

Glass Panel

The present invention sunroof assembly 30 has tiltable and slideable panel when attached to the slide mechanism. A glass panel sunroof is shown best in FIGS. 18-19. As illustrated, glass panel 32 has a tape on seal 34. Alternative designs can use either a metal frame or an encapsulation material to attach to a seal or both. This is desirable since glass dimensions typically have too much variance to effectively use its perimeter as the net surface of the seal when mass produced. The seal of the present design allows for the variation of glass size while bonding directly to the glass itself with an adhesive. During manufacturing, the installation of the seal to the glass panel allows one or the other to be assembled first. This allows manufacturing flexibility unknown in the art.

Figure 18:
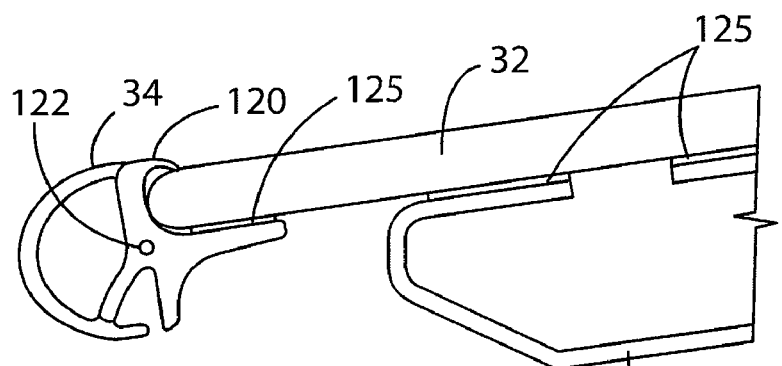
FIG. 18 illustrates a planar cut-away view of a glass panel assembly of one embodiment of a sunroof assembly according to the present invention taken along line A-A of FIG. 19.
Figure 19:
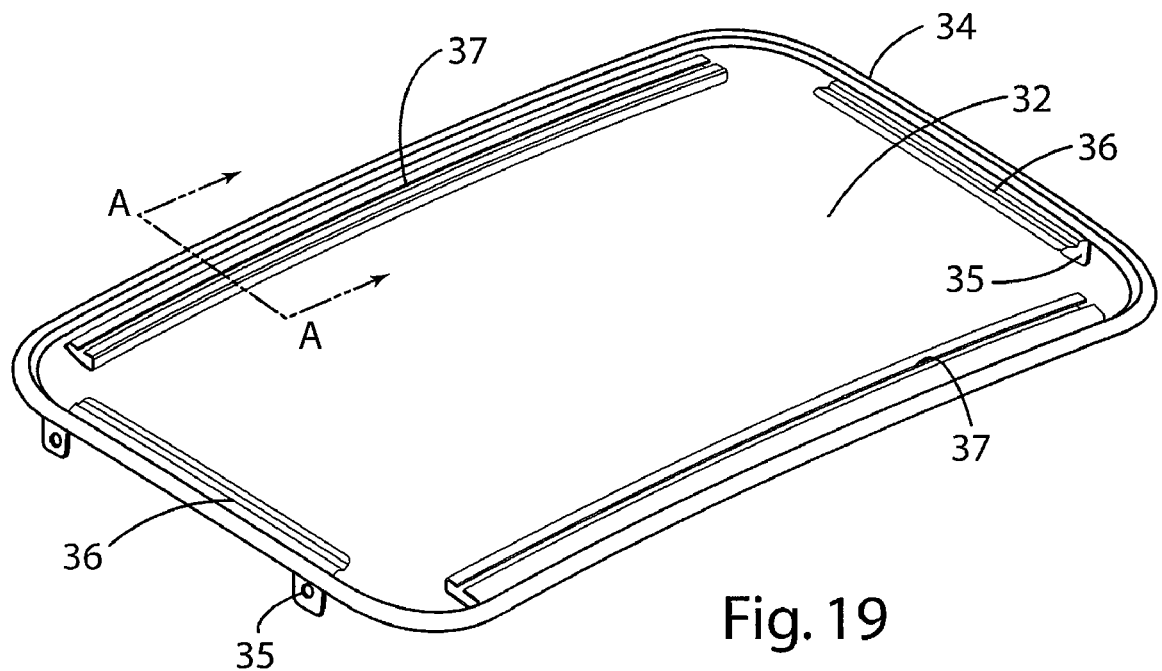
FIG. 19 illustrates a perspective top view of a glass panel assembly of one embodiment of a sunroof assembly according to the present invention.

As shown in FIG. 18, the cross section of the front of glass panel 32 (from line A-A of FIG. 19) has a reinforcement 37 and tape on seal 34 both held permanently in place by an adhesive. Adhesive 125 can be a tape on glass seal such as an adhesive tape sold under the brand name 3M. Reinforcement 37 can be permanently bonded to glass panel 32 by an adhesive designed to bond steel to glass such as one sold under the trade name DOW BETASEAL 57302. Tape on seal 34 components can optionally include a glass cord 120 and a rubber portion 122 (for example an ethylene propylene rubbers such as ethylene propylene diene (EPDM)). Tape on seal 34 is designed to limit the rotation of the seal as it cycles between an open and closed position while keeping an upper lip of the seal on top of the glass. This improves the appearance of the assembly.

Front and rear reinforcements 37 can be roll formed steel and be 1 mm E-coated 1008/1010, which further allows cut-to-length flexibility as found in other assembly component parts. Side brackets can be stamped steel 1.2 mm E-coated 1008/1010.

Modular Frame

In the art, frame design for sunroof assemblies frequently require dissimilar materials joined together requiring a variety of means of attaching parts such as snaps, screws, rivets, sealants, and the like at part interfaces to make a robust and watertight system. This can require extensive tooling and mold development for multiple parts. Further, different materials lead to different expansion rates, which can over time produce leaky joints or extra manufacturing steps in manufacturing to produce an adequate seal.

The present invention overcomes these challenges by providing a frame made from, for example, extrusion molds. Where injection molding is considered in the development of the entire sunroof frame, there must be some consideration for development costs associated with large injection molded pieces. Such large pieces have limited tool capacity, slow cycle time, high investment cost, and limits of applications for car sizes based on the sunroof module size. The present invention can be manufactured from extruded plastic rails and cross members. Corners 44 and end cap pieces 48, which are made from same or comparable materials as the side rails 46 and front rail 40, are then welded/fused/bonded together thus forming a complete, hermetically sealed, composite sunroof frame including water management components. Tooling investment is significantly reduced since the frame size dimensions may be varied merely by adjusting the length of the rails and cross members. Further, the need for sealants, such as butyl sealants, are eliminated since the connections are watertight. Standardized corners 44 made from the same material can also be employed. This allows the potential of assembly through vibration welding. This is a significant improvement over the prior art in that manufacturing is faster than various combinations of steps of sealing, screwing, riveting, and snapping of prior art frames. The present invention provides fewer parts, less failure modes, fewer manufacturing steps, and less design time needed to implement a sunroof design. The entire frame can be composite and the vertical slide track 50 can be configured to easily snap into place.

Figure 25:
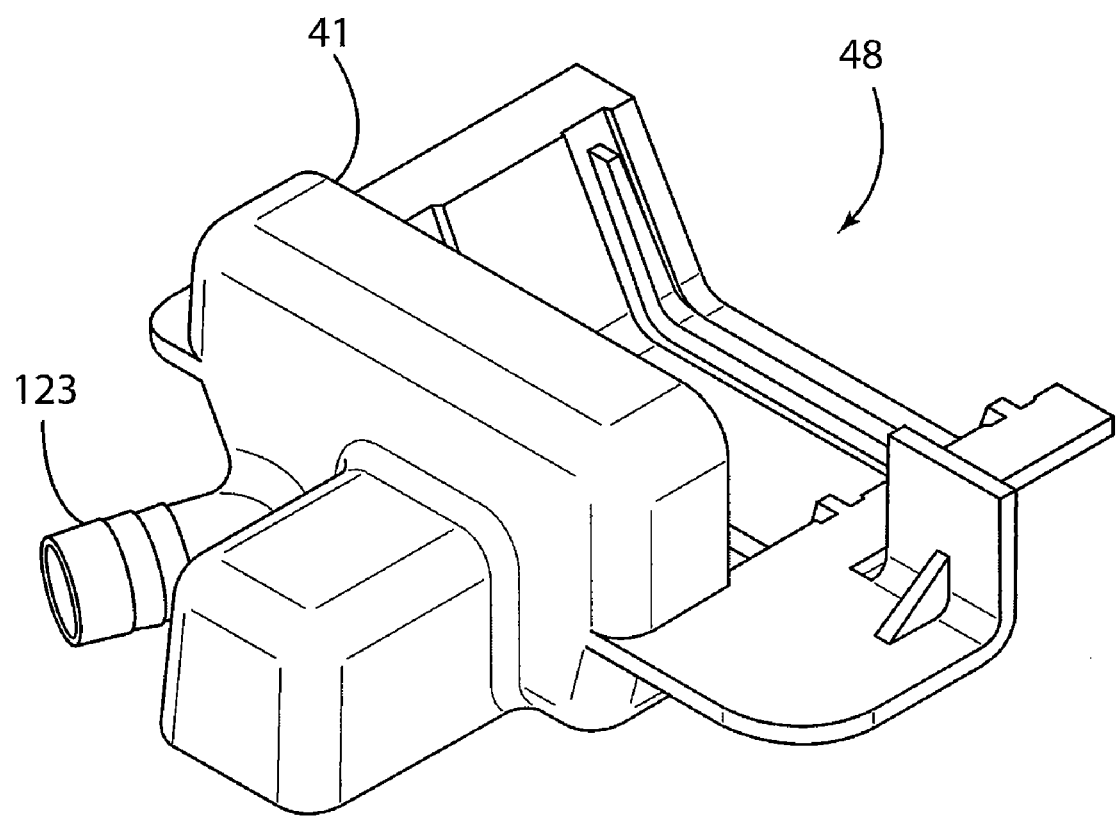
FIG. 25 illustrates a top perspective view of an end cap of one embodiment of a sunroof assembly according to the present invention.
Figure 26:
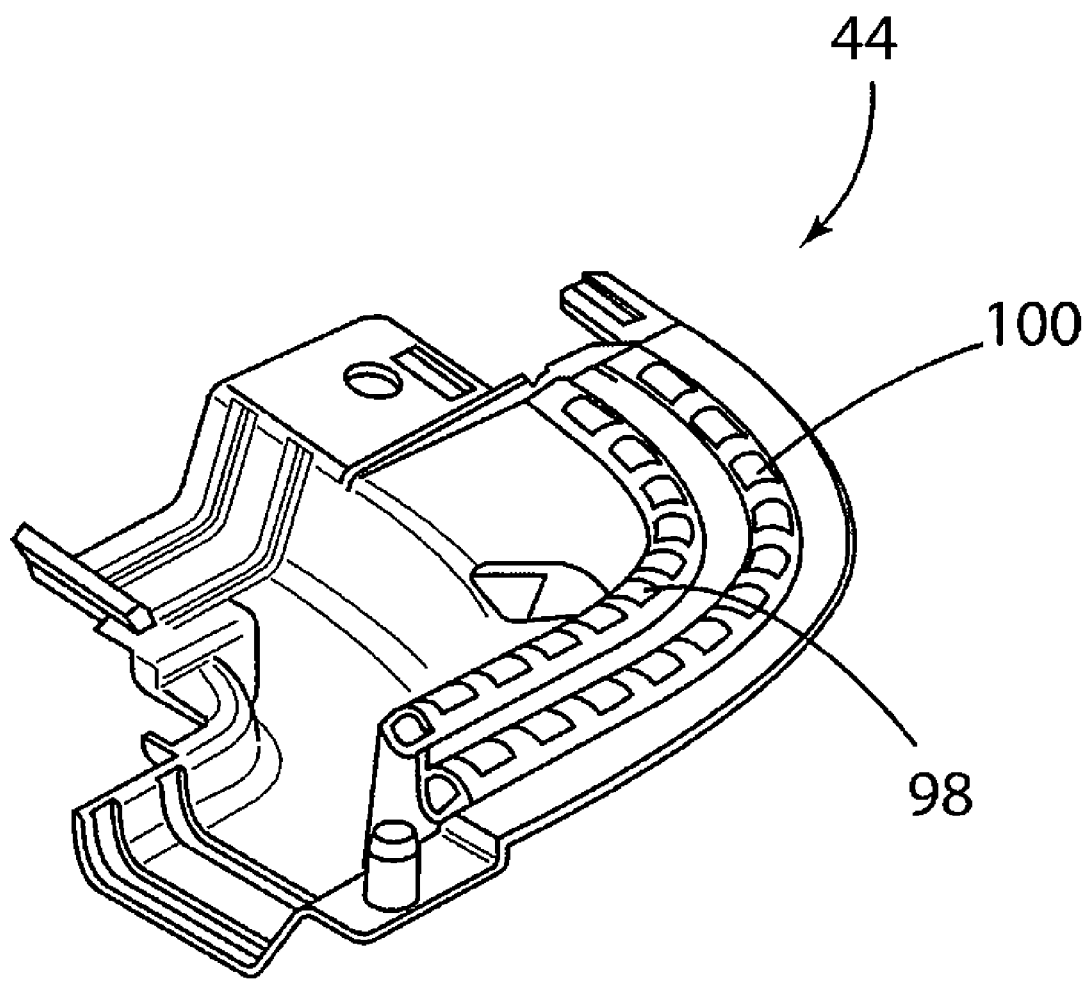
FIG. 26 illustrates a top perspective view of an integrated corner of one embodiment of a sunroof assembly according to the present invention.

For illustration, FIGS. 1-2, 25-26 show a composite modular frame assembly having a pair of side frame rails (side rails) 46, which can also serve as a water trough. The front end of side rails 46 connect to a front rail 40 by a pair of transitional corners (FIG. 26). Corners 44 have the two cable channels 98 and 100 described above to accommodate the dual cables to drive each side of the sunroof. This allows for a continuous channel throughout the perimeter of the assembly. The back end of side rails 46 are connected to a pair of mirror image end caps 48 (FIG. 25). End caps 48 can have a male drain connector 123 to attach to a water drain tube (not shown, but known in the art). Other features of end caps 48 include a sunshade rear stop 41. Other collateral features to a tilt slide sunroof are a wind deflector assembly 60, shown in FIG. 1, and more particularly in FIGS. 21-22. Wind deflector assembly 60 has a deflector 61 and a pivot 63. Deflector 61 can be made from extruded aluminum to accommodate multiple sun roof designs, by merely cutting deflector 61 to the desired length.

In summary, the modular frame for the present invention can be extrusions cut to length for modularity, corners and end caps can be reused for new applications using a multi-cavity tool, a plastic for ease of assembly and disassembly and recycling; the trough can carry the sunshade allowing for a shorter track; holes for mounting to a vehicle can be punched in line; the front rail ring can provide structure; straight cable channel allows a single continuous track (eliminating a cross over as found in the prior art); easy and reliable assembly using vibration welding; use of low tool cost extrusions with any needed holes die punched.

Figure 20:
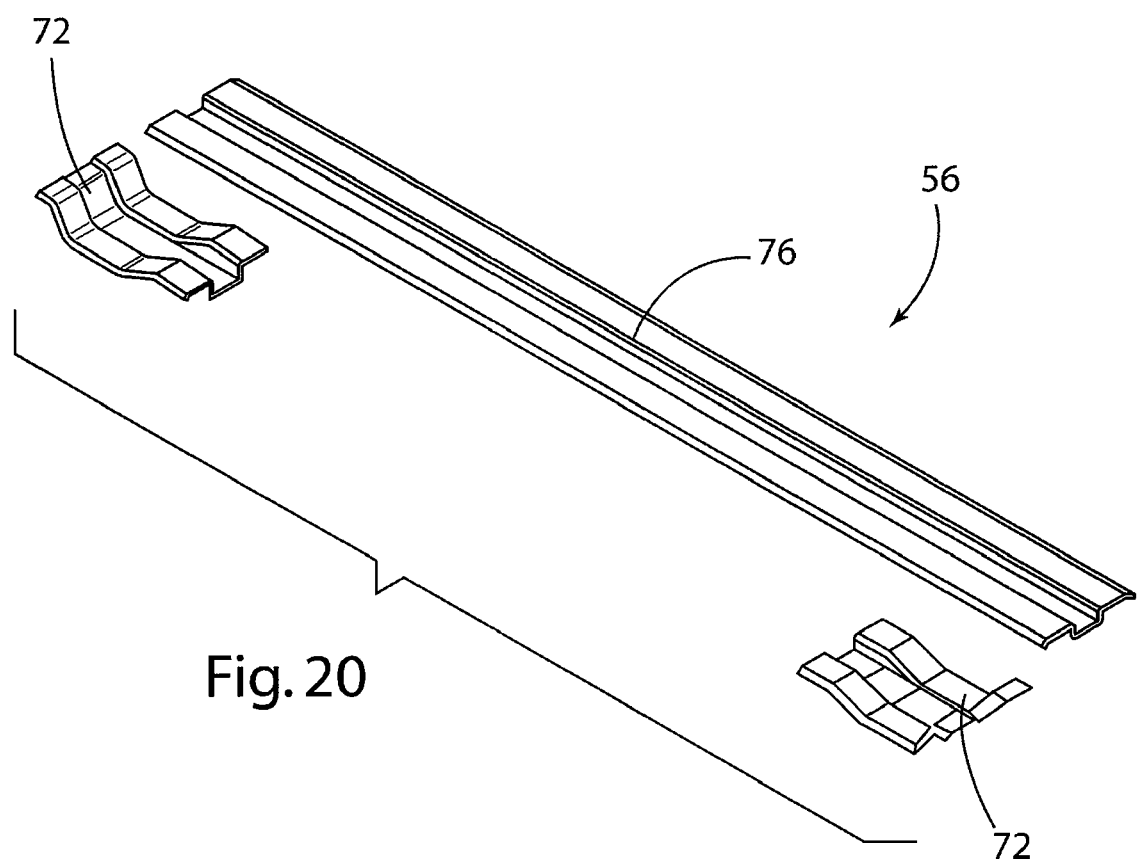
FIG. 20 illustrates an exploded perspective view of a reinforcement assembly of one embodiment of a sunroof assembly according to the present invention.

Structural integrity can be added by including a three piece reinforcement bar 56 (show in detail in FIG. 20). The reinforcement bar 56, as shown has two identical end pieces 72 and a center piece 76. The advantage of a three piece reinforcement is for ease and economy of manufacture across a variety of applications. The end pieces can be used for any desired application without modification. The roll formed center piece need only be cut to length to match the desired width of sunroof assembly 30. When assembled, reinforcement bar 56 is attached to vertical slide track 50.

Additional frame components can include a motor 42 to drive cables 58 connected to the vertically mounted slide mechanisms 54, a wear plate to reduce potential wear to the front rail 40 from the motor and cable movement.

Assembly

The present sunroof assembly 30, using the components and composite framework described above can result in additional benefits by faster time to market for new applications and improving manufacturing costs and efficiency. Modular components require less inventory for the manufacturer and use of composites provides flexibility and rigidity to accommodate a greater variety of vehicle roof shapes. The size of the sunroof assembly can be adjusted by just cutting the extrusions of the front and side rails to the desired length. The corners and end caps thus standardized across a variety of applications. Mounting holes 55, such as shown in FIGS. 27-28 can be punched in-line during manufacture. The rails, corner pieces and end caps can be connected by friction welding.

A summary of advantages of the current invention that improve assembly over the prior art include the use of a modular frame, vibration welded frame assembly (optionally sonic, pulse, laser, plastic, or high frequency welding). These hermetically sealed joints eliminate need for butyl, rivets, and the like. The all plastic components allow for easy assembly and disassembly and are easily adaptable in size length and width. The slide track, sunshade and water management rail are all snap fitted together. Straight cable channels require lower and more uniform forces, thus a reduction in motor size is possible. The use of extruded plastic and metal roll formed parts replaces the use of more expensive injection molded and stamped parts. Thus tooling costs are reduced. The corner and end caps can be used for new programs using the same multi cavity tool. The present vertical slide track requires less material since the cantilever is reduced. Water Management, now inboard of prior art designs, also uses less material. Functional integration of sunshade and water trough further reduces material needs since water management is de-coupled from the slide track.

Figure 29:
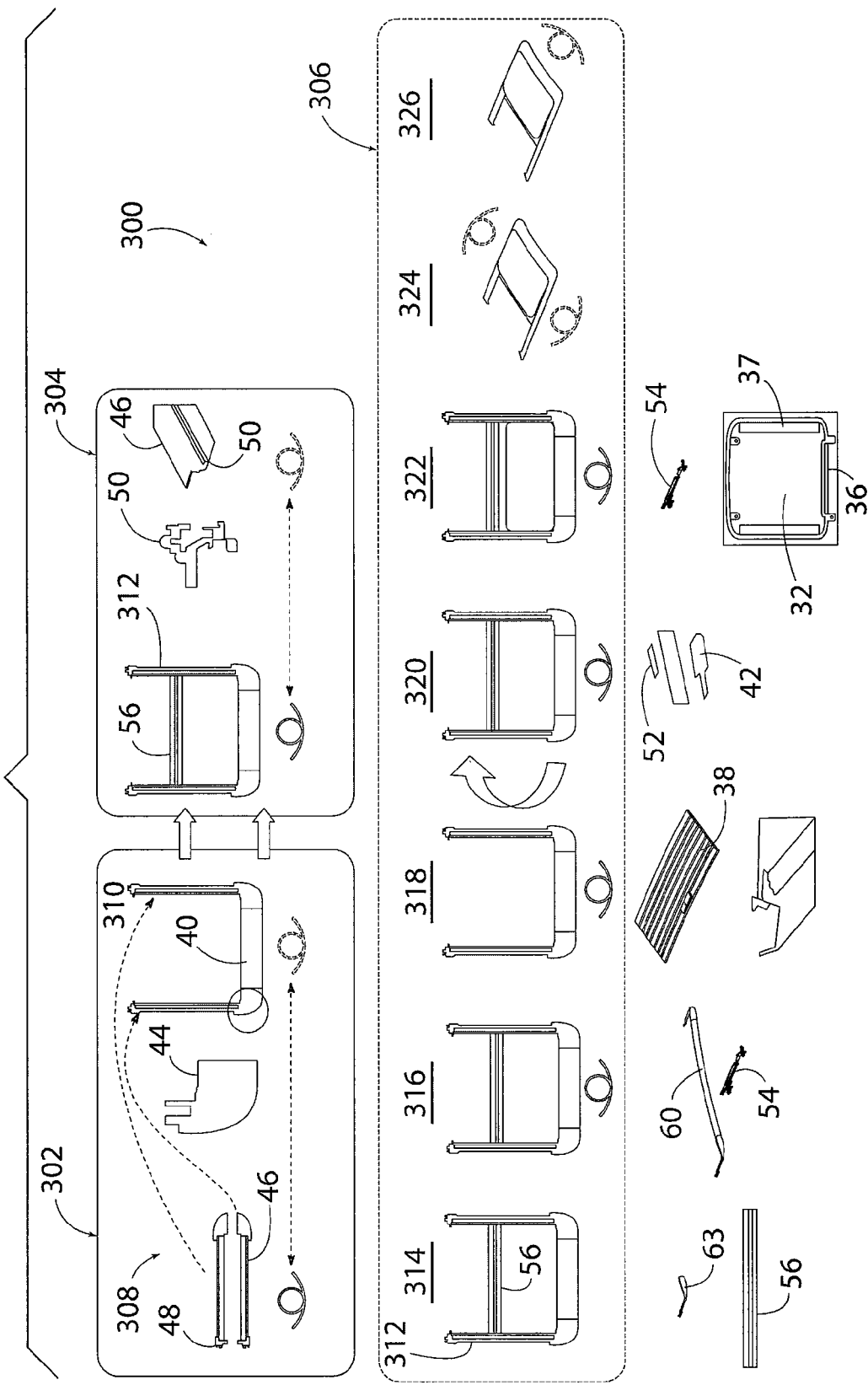
FIG. 29 illustrates a manufacturing sequence of a sunroof assembly according to one embodiment of the present invention.

Turning now for FIG. 29, a manufacturing process flow for the present invention is described. This process, generally shown at 300, involves a first sub-assembly 302, a second sub-assembly 304, and a main assembly 306. Other manufacturer processes and sequences are possible within the scope of this invention. The steps detailed below are to illustrate just one possible manufacturing process.

First sub-assembly 302 can be a vibration weld station where at step 308 corners 44 and end caps 48 are welded to side rails 46. Next, at step 310 the front rail 40 can be vibration welded to the corners 44. This forms a water management assembly (WMA) 312.

Next, at second sub-assembly 304, reinforcement bar 56 is placed under WMA 312. Slide tracks are then greased and snapped into place along the length of side rail 46 of WMA 312.

Next, WMA 312 and reinforcement bar 56 enter the main assembly line 306. First, at step 314, reinforcement bar 56 is attached to WMA 312 by standard rivet, piece rivet, or the like. Wind deflector pivot 63 is next welded to slide rail 26 by ultrasonic weld.

Next, at step 316, wind deflector 61 is attached to wind deflector pivot 63, cables 58 is inserted into cable channel 98 and 100, and vertical slide mechanism 54 is installed within vertical slide track 50.

Next, at step 318, sunshade 38 is installed onto side rail 46. Installation can be by snap fit.

Next, at step 320, motor 42 is installed onto front rail 40. This is achieved through two screw positions on motor 42 and wear plate 52, with front rail 40 disposed in between.

Next, at step 322, the glass panel 32 is attached to at mounting points 39 on vertical slide mechanism 54.

Next, at step 324 the completed sunroof assembly is tested, followed by final inspection, packing and shipping at step 326.

While the invention has been described in conjunction with specific embodiments, it is evident that many alternatives, modifications, and variations will be apparent to those skilled in the art in light of the foregoing description. Accordingly, the present invention attempts to embrace all such alternatives, modifications, and variations that fall within the spirit and scope of the appended claims.

What is claimed is:

1. A sunroof assembly for an opening of a vehicle, comprising:
   a composite water management assembly having a pair of parallel side rails having a water trough and a forward and a rearward end, a pair of transitional corners connected to the forward ends of the side rails, a front rail connected to the corners at substantially right angles to the side rails, and a pair of end caps connected to the rearward ends of the side rails;
   a vertically oriented slide track snap fitted into substantially the length of the side rails;
   a reinforcement bar connected to the vertically oriented slide track at substantially right angles to the rearward end of vertical slide tracks;
   a pair of mirror image slide mechanisms with vertically oriented mounts, retained but free to slide within a channel of the vertical slide track and outboard of the water trough; and
   a movable panel attached to the slide mechanism,
   wherein each slide mechanism comprises a tilting structure configured to hold the movable panel in a tilted ventilation orientation.

2. The sunroof assembly of claim 1, further comprising:
   a sunshade having a guide mounted to, but free to slide on, the side rails, the sunshade having an upper substrate having at least one water-shedding rib, wherein water is channeled to the inboard water trough of the side rails.

3. The sunroof assembly of claim 2, wherein the sunshade further comprises a lower substrate bonded to the upper substrate having a predetermined texture and color.

4. The sunroof assembly of claim 2, wherein the sunshade slidable guide has a rotational allowance permitting the guide to rotate relative to the side rails.

5. The sunroof assembly of claim 4, wherein the sunshade slidable guide further comprises a recess window of the sunshade.

6. The sunroof assembly of claim 1, wherein the side rails, front rails, and slide track are formed by extrusion, whereby efficient flexibility in assembly dimensions is allowed.

7. The sunroof assembly of claim 1, wherein the reinforcement bar comprises a center piece attached at each end by an end piece.

8. The sunroof assembly of claim 7, wherein center piece is made of roll formed metal, whereby efficient flexibility in assembly dimensions is allowed.

9. The sunroof assembly of claim 1, wherein the water management assembly consists of efficiently recyclable materials.

10. The sunroof assembly of claim 9, wherein the water management assembly components are hermetically connected solely by vibration welding.

11. The sunroof assembly of claim 1, wherein the movable panel is a glass panel having a tape on seal around its perimeter, a front and a rear glass panel reinforcement, and a pair of mirror side brackets having tabs to attach to a pair of mounting points on each slide mechanism.

12. The sunroof assembly of claim 11, wherein the rear glass panel reinforcement is roll formed metal, whereby efficient flexibility in glass panel dimensions is allowed.

13. The sunroof assembly of claim 1, further comprising:
a motor and wear plate attached to the front rail, the motor connected to a power source and controlled by a user activated controller;
a first cable connected to one slide mechanism and retained, but free to slide, within an outboard cable channel of the water management assembly;
a second cable connected to the mirror slide mechanism and retained, but free to slide, within an inboard cable channel;
the cable channels running the perimeter of the water management assembly; and
the cables connected to and moveable by a motive force from the motor.

14. The sunroof assembly of claim 1, further comprising a wind deflector assembly having a pair of mirror image deflector pivots attached toward the forward end of the side rails, and a wind deflector attached at both ends of the deflector pivots.

15. The sunroof assembly of claim 2, wherein the sunshade is attached to the inner edge of the side rail by a plurality of tabs.

16. A method of making a sunroof assembly, comprising the steps of:
assembling a composite water management assembly by connecting a pair of parallel side rails having a water trough and a forward and a rearward end, to a pair of transitional corners connected to the forward ends of the side rails, and to a front rail at substantially right angles to the side rails, and to a pair of end caps connected to the rearward ends of the side rails;
snap fitting a vertical slide track into substantially the length of the side rails;
connecting a reinforcement bar to the slide track at substantially right angles toward the middle of the vertical slide track;
inserting a pair of mirror image slide mechanisms with vertically oriented mounts within a channel of the slide track and outboard of the water trough, wherein each slide mechanism comprises a tilting structure configured to hold the movable panel in a tilted ventilation orientation; and
attaching a movable panel to the slide mechanism.

17. The method of claim 16, wherein the step of connecting is by vibration welding.

18. The method of claim 16, further comprising the step of snap fitting a sunshade to the side rails.

19. A vehicle, comprising:
a roof with an opening; and
a sunroof assembly disposed at the opening and comprising:
a composite water management assembly having a pair of parallel side rails having a water trough and a forward and a rearward end, a pair of transitional corners connected to the forward ends of the side rails, a front rail connected to the corners at substantially right angles to the side rails, and a pair of end caps connected to the rearward ends of the side rails;
a reinforcement bar connected at substantially right angles to the rearward end of side rails;
a vertically oriented slide track snap fitted into substantially the length of the side rails;
a pair of mirror image slide mechanisms with vertically oriented mounts, retained, but free to slide, within a channel of the slide track and outboard of the water trough; and
a movable panel attached to the slide mechanism,
wherein each slide mechanism comprises a tilting structure configured to hold the movable panel in a tilted ventilation orientation.

20. The sunroof assembly of claim 14, wherein the side rails, the front rail, the vertical slide mechanisms, the wind deflector, and the reinforcement bar are all alterable by being cut to a predetermined length dimension.

21. The sunroof assembly of claim 1 wherein both the side rail and slide track comprise mounts that generally extend longitudinally along the side rail and slide track to engage each other to form a snap-fit connection.

22. The sunroof assembly of claim 21 wherein the mounts are hook-shaped in cross-section.

23. The sunroof assembly of claim 1 wherein the slide track snaps onto a bottom of the side rail.

24. The sunroof assembly of claim 1 wherein the water trough comprises a wall forming the innermost end of the side rail.

25. The sunroof of claim 24 further comprising a sunshade slidably mounted on the wall.

26. The sunroof assembly of claim 1 further comprising a sunshade, and wherein the side rail further comprises a separate mount forming a sidewall of the water trough and slidably engaging the sunshade.

27. The sunroof assembly of claim 1 further comprising a sunshade, and wherein the side rail further comprises a separate mount for slidably engaging the sunshade in a longitudinal direction, and rotatably engaging the sunshade in a transverse direction.

28. The sunroof assembly of claim 27 wherein the mount has a widened distal end for being rotatably clasped by the sunshade.

* * * * *